(12) United States Patent
Ishida et al.

(10) Patent No.: US 6,269,069 B1
(45) Date of Patent: Jul. 31, 2001

(54) OPTICAL DISK, OPTICAL DISK DEVICE, AND METHOD OF REPRODUCING INFORMATION ON OPTICAL DISK

(75) Inventors: Takashi Ishida, Yawata; Toyoji Gushima, Habikino, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/569,385

(22) Filed: May 11, 2000

Related U.S. Application Data

(63) Continuation of application No. 09/117,825, filed as application No. PCT/JP97/00337 on Feb. 7, 1997.

(30) Foreign Application Priority Data

Feb. 8, 1996 (JP) ........................................................ 8-22273

(51) Int. Cl.⁷ .................................................... G11B 9/00
(52) U.S. Cl. .................................. 369/275.3; 369/59.75; 369/47.19
(58) Field of Search ................................. 369/47, 48, 59, 369/275.3

(56) References Cited

U.S. PATENT DOCUMENTS

| | | |
|---|---|---|
| 4,736,352 | 4/1988 | Satoh et al. . |
| 4,949,330 | 8/1990 | Pasman et al. . |
| 5,134,601 | 7/1992 | Greenwell et al. . |
| 5,233,592 | 8/1993 | Suzuki et al. . |
| 5,359,584 | 10/1994 | Fukushima et al. . |

(List continued on next page.)

FOREIGN PATENT DOCUMENTS

| | | |
|---|---|---|
| 4411872 | 10/1994 | (DE) . |
| 0420179 | 4/1991 | (EP) . |
| 0461912 | 12/1991 | (EP) . |
| 0517473 | 12/1992 | (EP) . |
| 0517483 | 12/1992 | (EP) . |

(List continued on next page.)

OTHER PUBLICATIONS

Eurpopean Search Report dated Jul. 19, 2000 Re; Patent #00105674.6.
European Search Report dated Jul. 19, 2000 Re: Patent No. 00105675.3.
European Search Report dated Jul. 19, 2000 Re: Patent No. 00105752.0.
European Search Report dated Jul. 19, 2000 Re: Patent No. 00105753.8.
European Search Report regarding Patent No. 00105753.8–2210–Dated Jul. 19, 2000.

(List continued on next page.)

*Primary Examiner*—Nabil Hindi
(74) *Attorney, Agent, or Firm*—Renner, Otto, Boisselle & Sklar

(57) ABSTRACT

The present invention is aimed at providing an optical disk, an optical disk device, and an optical disk reproduction method, for allowing for stable and efficient reading of address information. The optical disk includes a plurality of tracks each divided into a plurality of recording sectors. Each of the recording sectors includes a header region. The header region includes address information for identifying the position of the corresponding recording sector and address synchronous information for identifying the recording position of the address information for bit synchronization. The address information has been modulated using a run length limit code of a maximum inversion interval of $T_{max}$ bits ($T_{max}$ is a natural number), and the address synchronous information includes two patterns of which inversion interval is ($T_{max}+3$) bits or more, so that the reproduced signal of the address synchronous information is distinguished from the reproduced signal of other information.

2 Claims, 25 Drawing Sheets

U.S. PATENT DOCUMENTS

| | | |
|---|---|---|
| 5,544,149 | 8/1996 | Katayama et al. . |
| 5,809,007 | 9/1998 | Takemura et al. . |
| 5,881,037 | 3/1999 | Tanaka et al. . |
| 5,930,227 | 7/1999 | Fujimoto et al. . |

FOREIGN PATENT DOCUMENTS

| | | | |
|---|---|---|---|
| 0625828 | 11/1994 | (EP) | ................................ 369/32 |
| 0673029 | 12/1994 | (EP) . | |
| 0673027 | 9/1995 | (EP) . | |
| 0757343 | 2/1997 | (EP) . | |
| 0801382 | 10/1997 | (EP) . | |
| 57-164443 | 10/1982 | (JP) . | |
| 61-104467 | 5/1986 | (JP) . | |
| 61-287077 | 12/1986 | (JP) . | |
| 63-281276 | 11/1988 | (JP) . | |
| 01151334 | 6/1989 | (JP) . | |
| 2162576 | 6/1990 | (JP) . | |
| 3083232 | 4/1991 | (JP) . | |
| 03113872 | 5/1991 | (JP) . | |
| 04153919 | 5/1992 | (JP) . | |
| 04212718 | 8/1992 | (JP) . | |
| 58155511 | 9/1993 | (JP) . | |
| 05342819 | 12/1993 | (JP) . | |
| 06176404 | 6/1994 | (JP) . | |
| 6176504 | 6/1994 | (JP) . | |
| 7093904 | 4/1995 | (JP) . | |
| 07134869 | 5/1995 | (JP) . | |
| 7211005 | 8/1995 | (JP) . | |
| 08007276 | 1/1996 | (JP) . | |
| 9512392 | 12/1997 | (JP) . | |
| 9522802 | 8/1995 | (WO) . | |
| 9631881 | 10/1996 | (WO) . | |

OTHER PUBLICATIONS

JPO Office Action dated Dec. 9, 1999 for JP Application 11–233311 and translation thereof.

JPO Office Action dated Dec. 9, 1999 for JP Application 11–2333–12 and translation thereof.

JPO Office Action dated Dec. 9, 1999 for JP Application 11–233313 and translation thereof.

JPO Office Action dated Dec. 9, 1999 for JP Application 11–233314 and translation thereof.

European Office Action dated Nov. 9, 1999 for corresponding European App. EP9790265.8.

FIG.2A
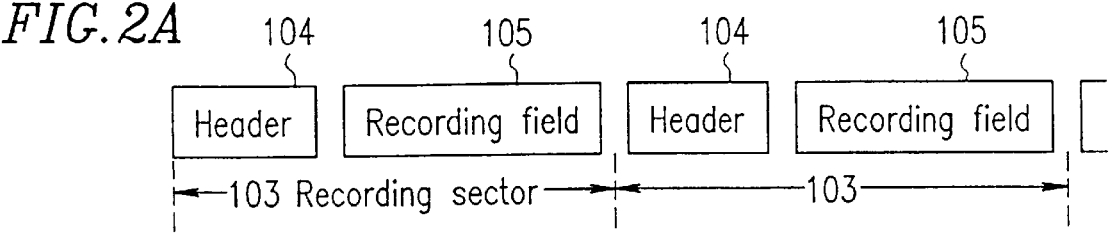
FIG.2B
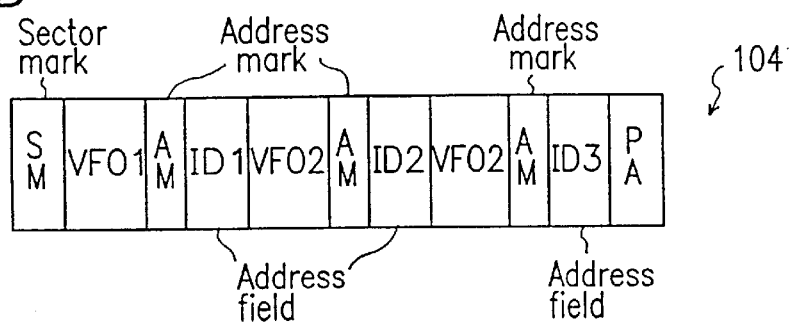
FIG.2C Pattern of sector mark SM
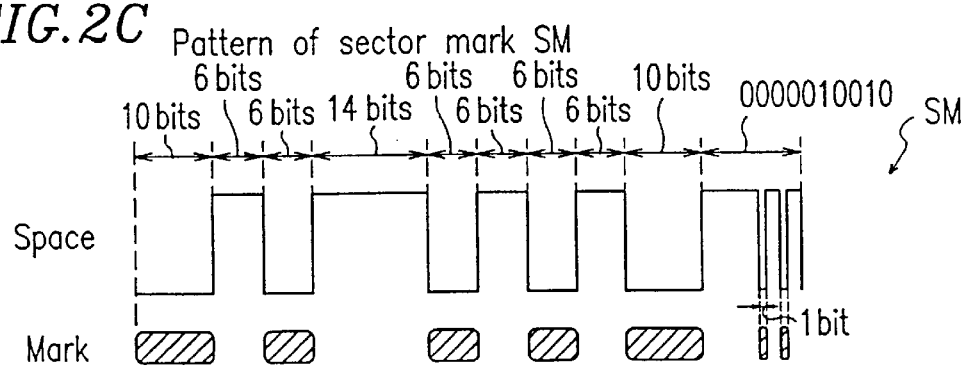
FIG.2D Pattern of address mark AM
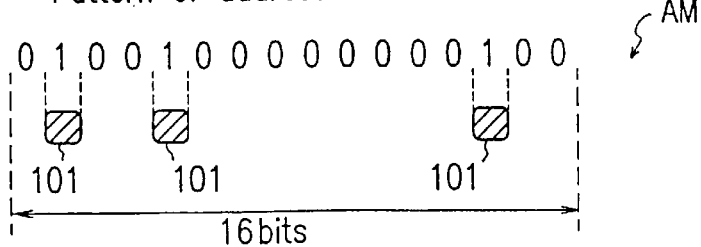

Conversion table of (2,7) modulation code

| Digital data | Code sequence |
|---|---|
| 1 0 | 0 1 0 0 |
| 0 1 0 | 1 0 0 1 0 0 |
| 0 0 1 0 | 0 0 1 0 0 1 0 0 |
| 1 1 | 1 0 0 0 |
| 0 1 1 | 0 0 1 0 0 0 |
| 0 0 1 1 | 0 0 0 0 1 0 0 0 |
| 0 0 0 | 0 0 0 1 0 0 |

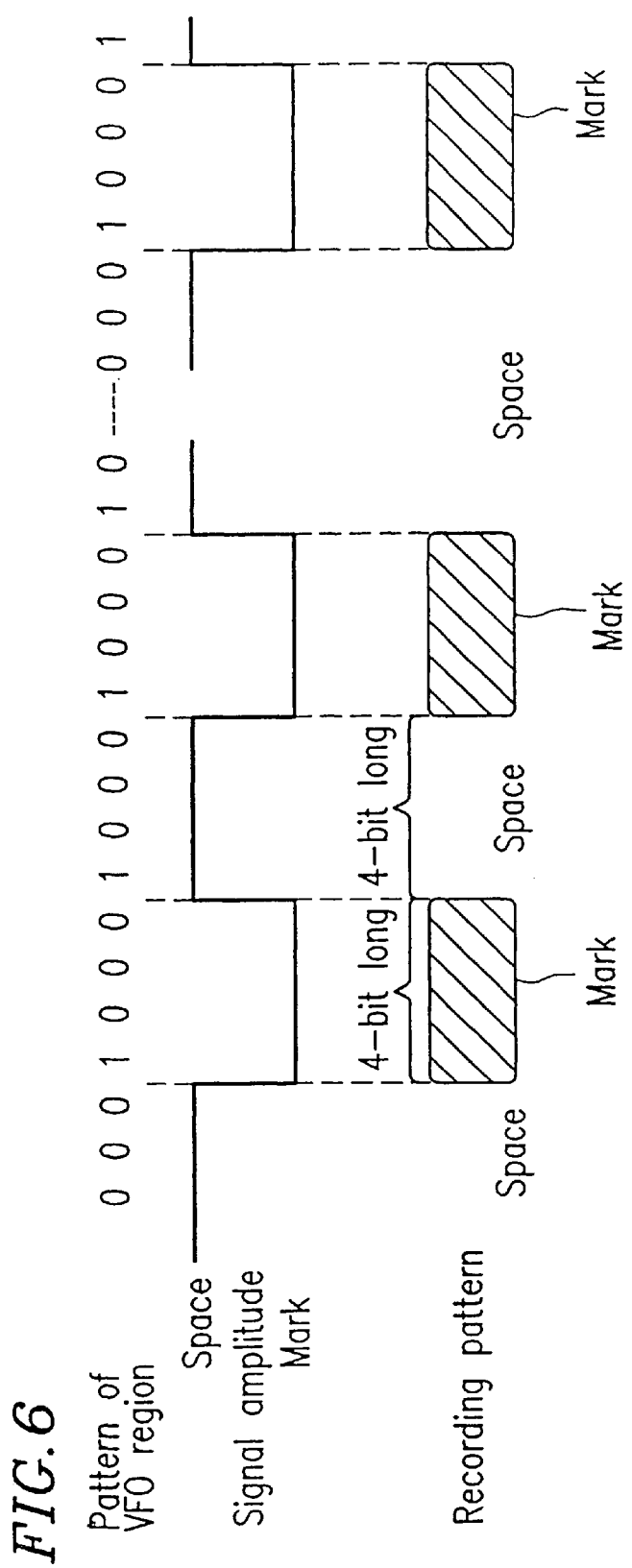

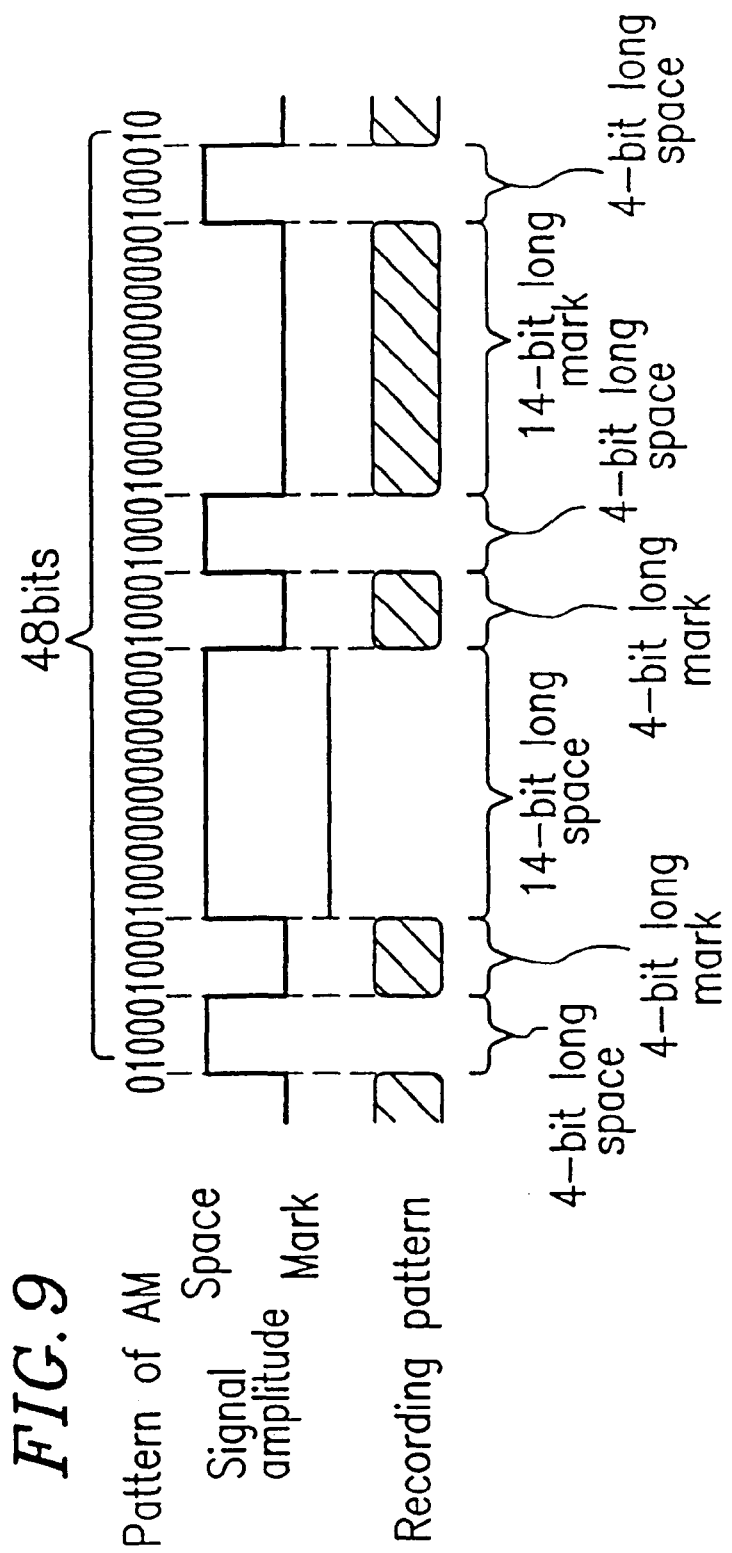

23 Asynchronous binary data  VFO detection pulse 26

VFO detection table

| Input 32 bits (Parallel data 29) | Output 1 bit (VFO detection pulse 26) |
|---|---|
| 11110000111100001111000011110000 | 1 |
| 00001111000011110000111100001111 | 1 |
| 11111000111100011110001111111000 | 1 |
| 00011111000111100011111000111111 | 1 |
| 11110000111100001111000000111100 | 1 |
| 00001111000001111000011111000011 | 1 |
| ⋮ | |
| Other patterns | 0 |

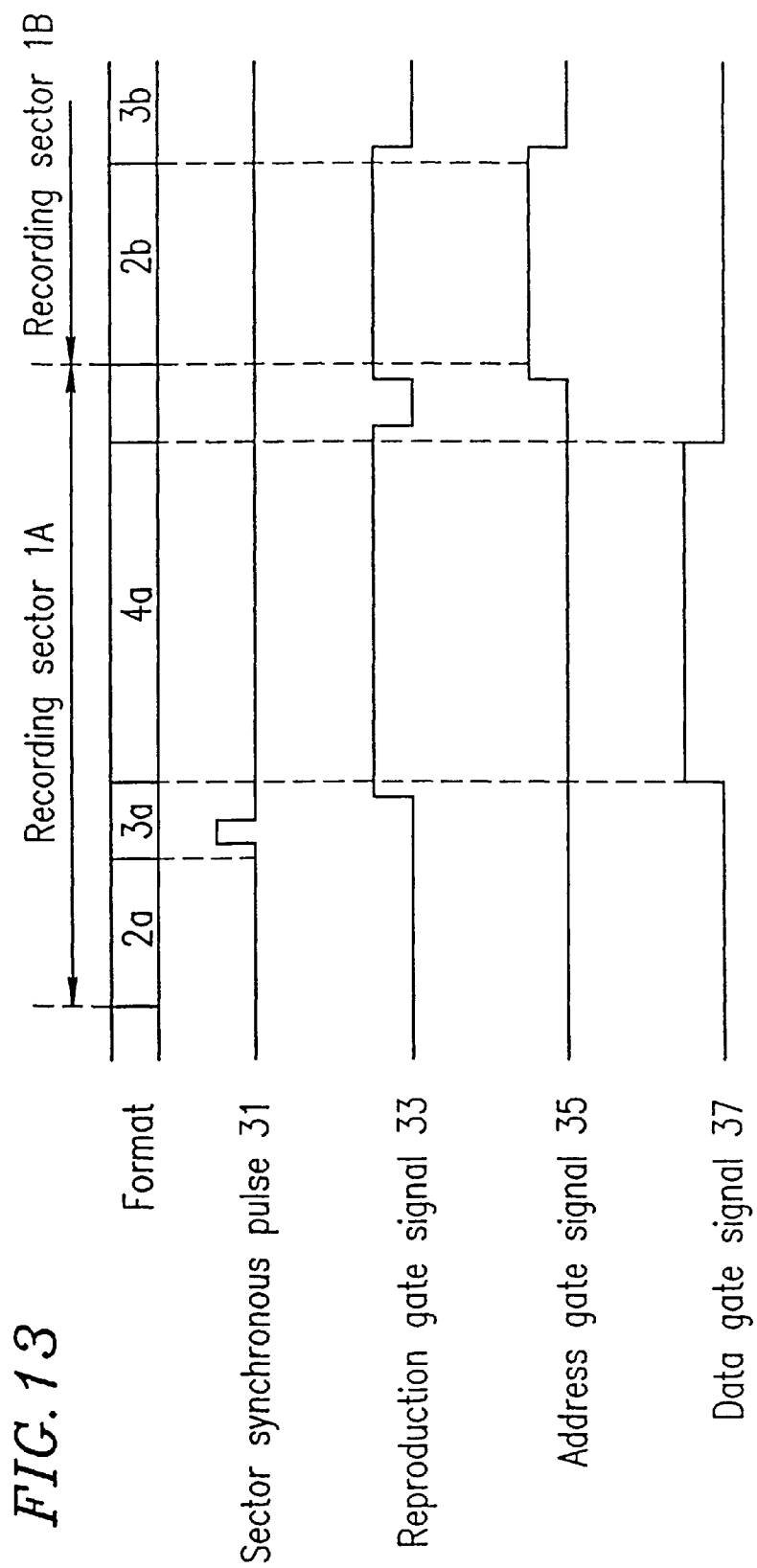

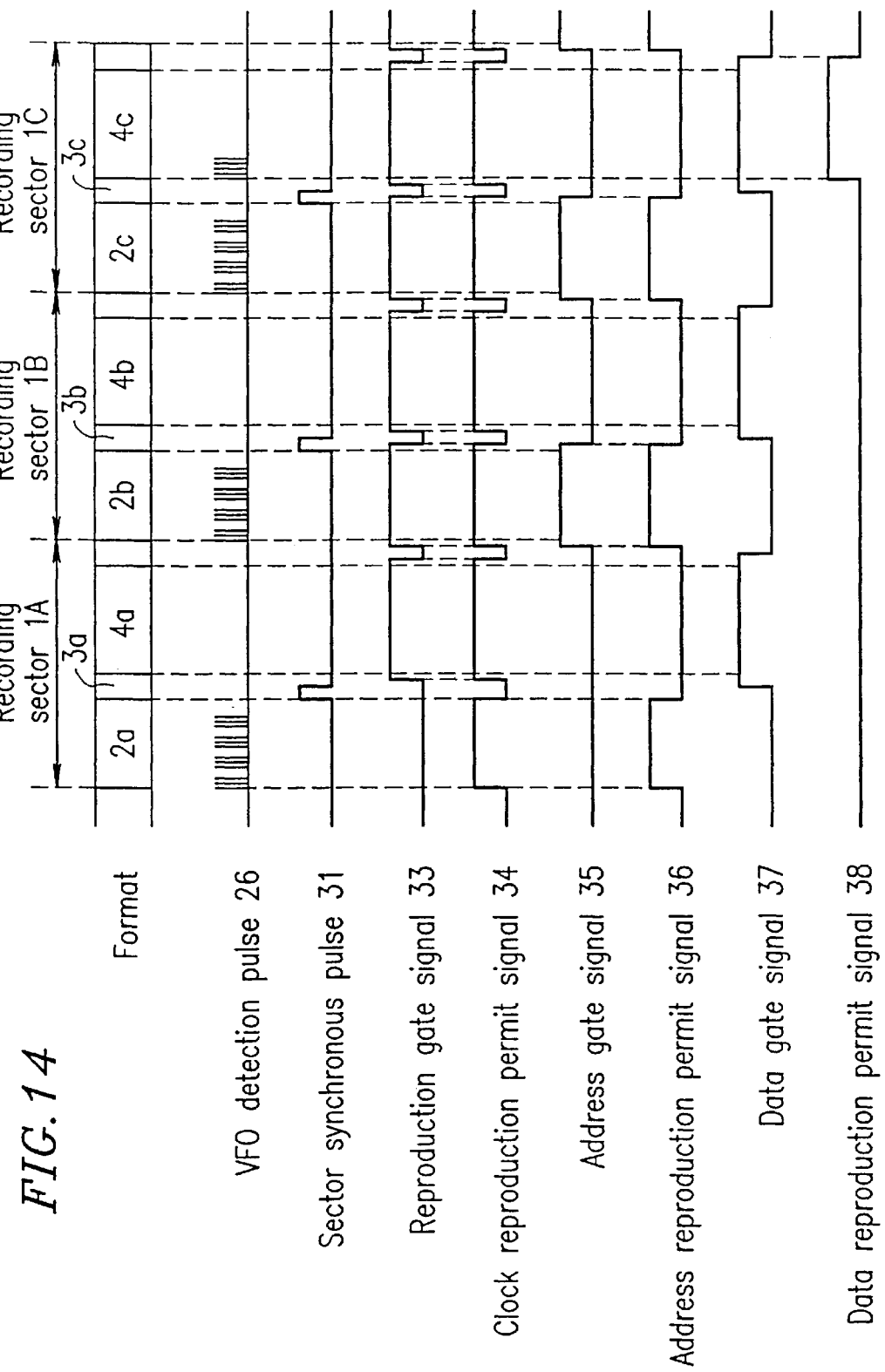

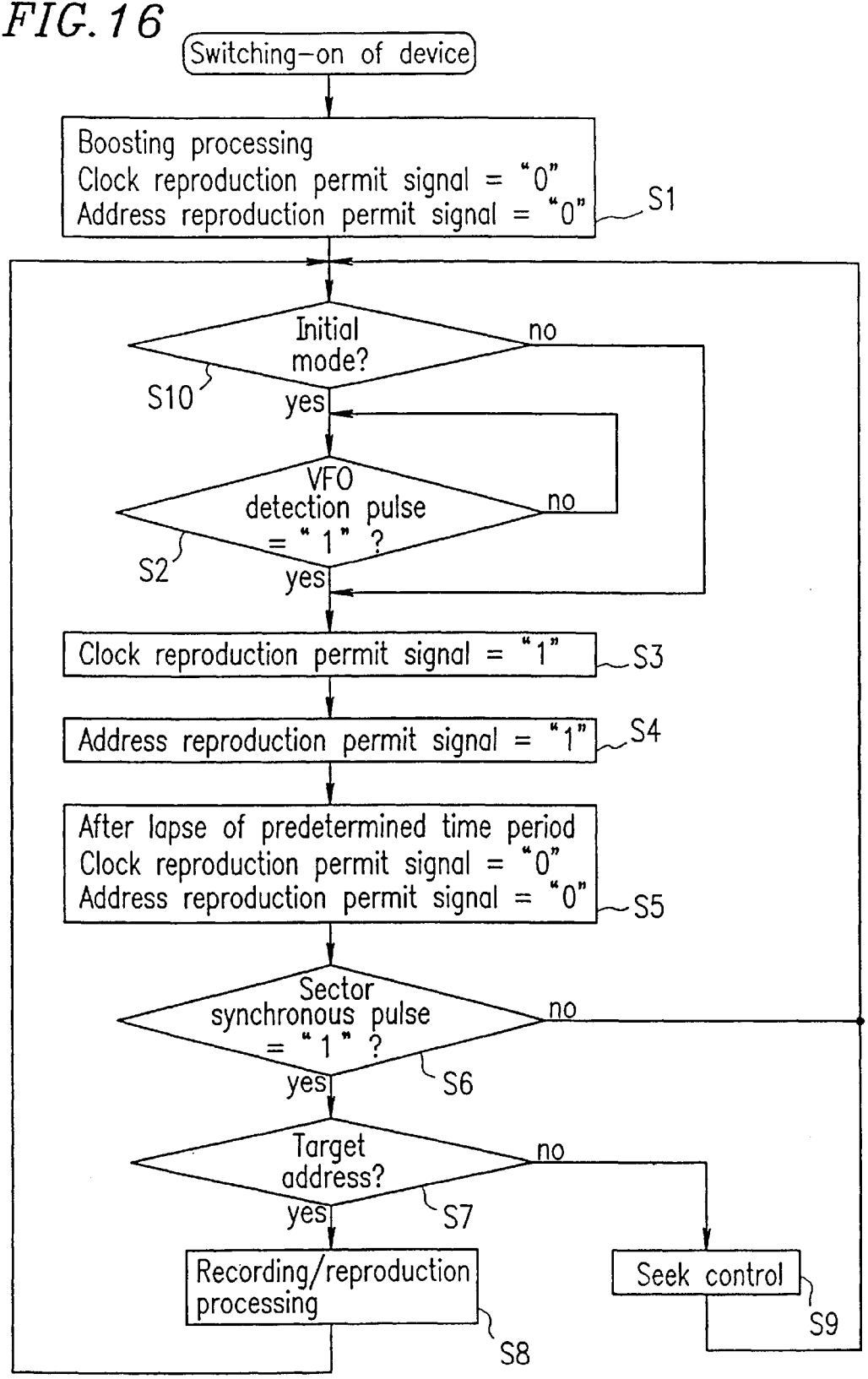

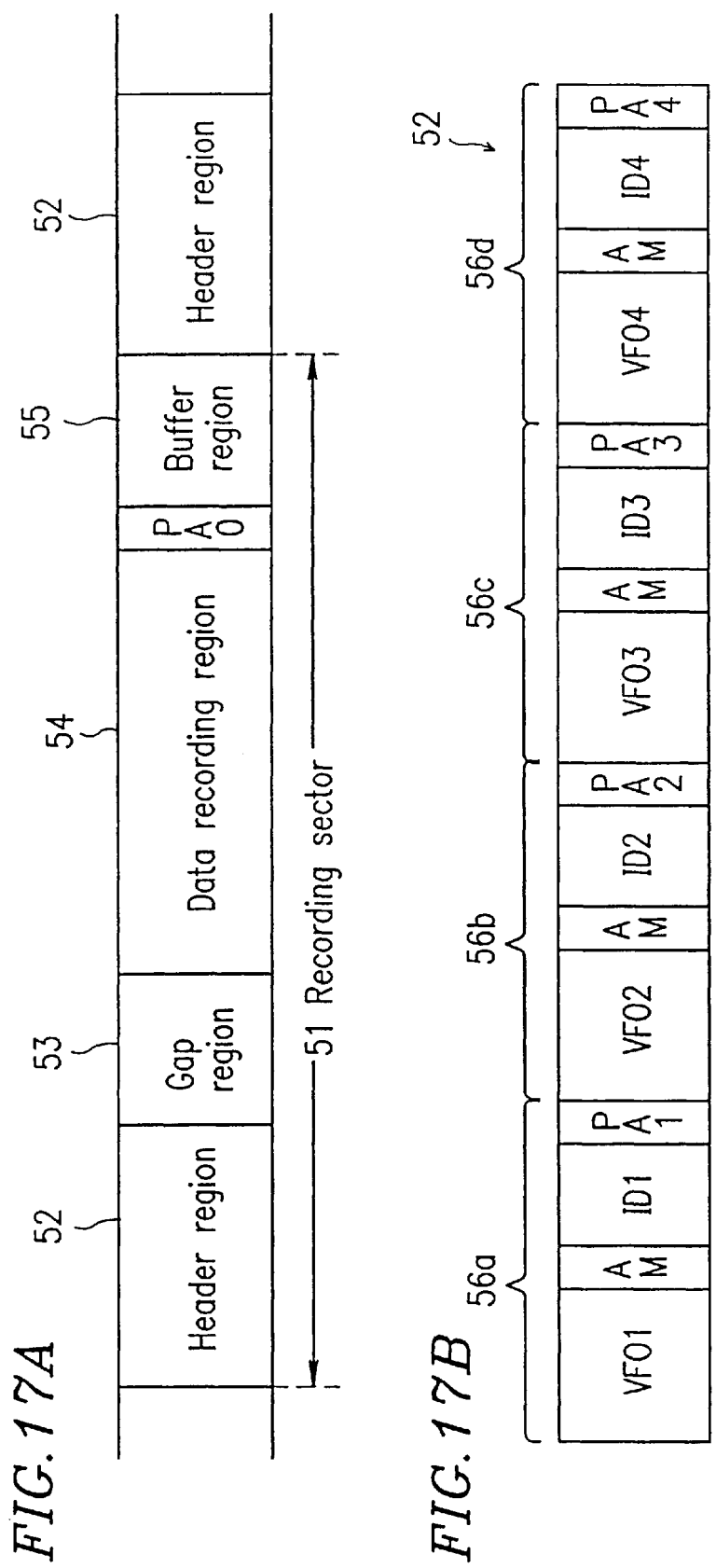

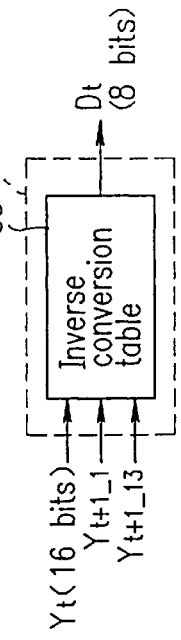
FIG.18A Construction of modulation circuit
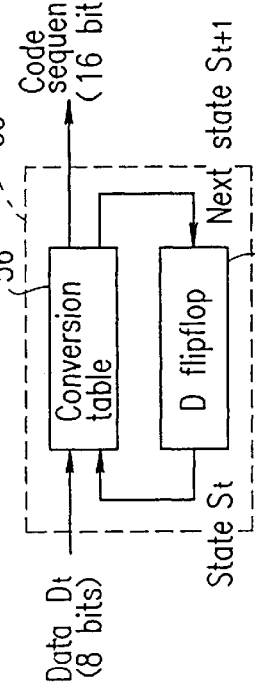
FIG.18C Construction of demodulation circuit
FIG.18B Content of conversion table When next state is 1 or 2

When next state is 3 or 4

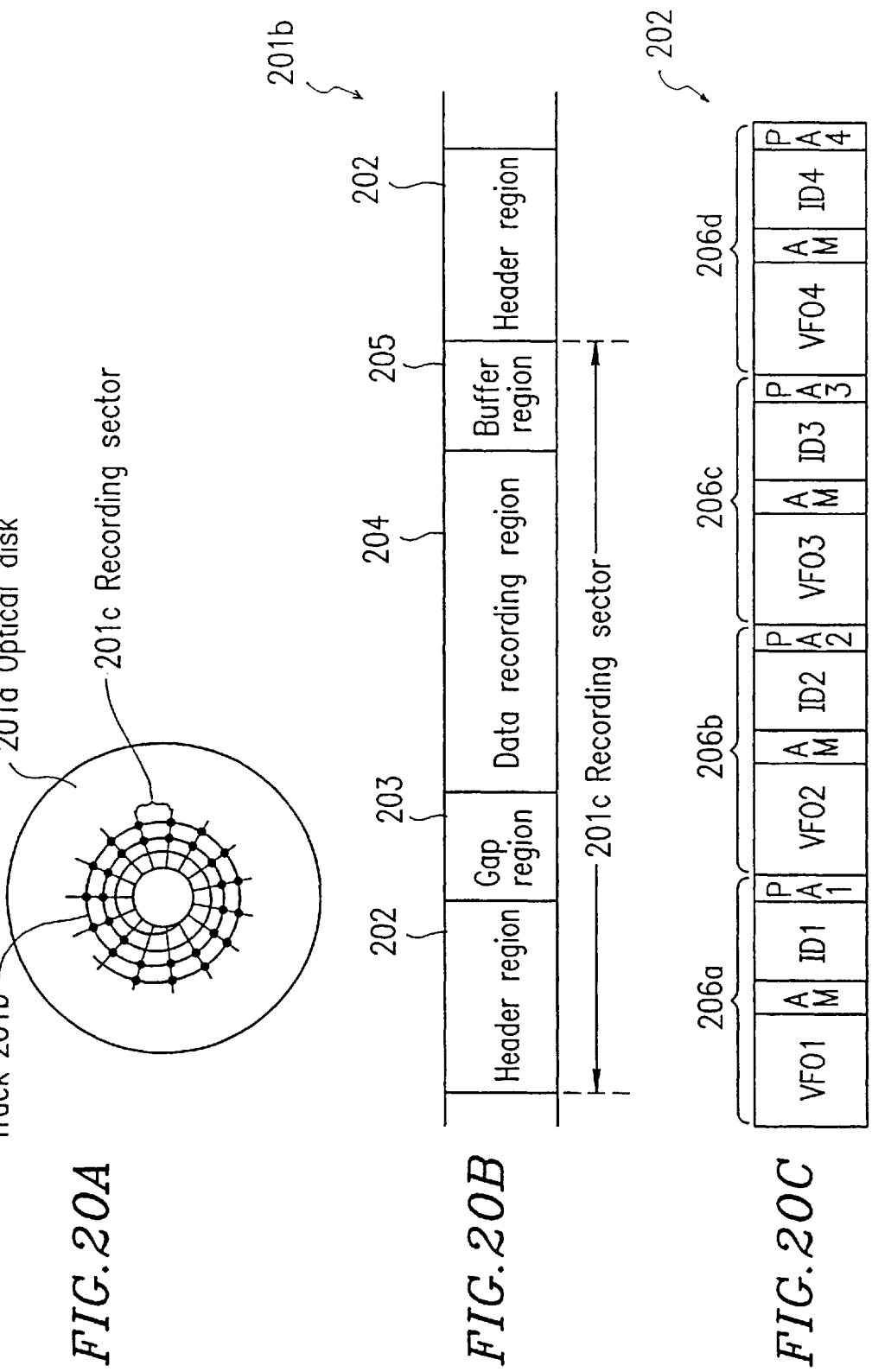

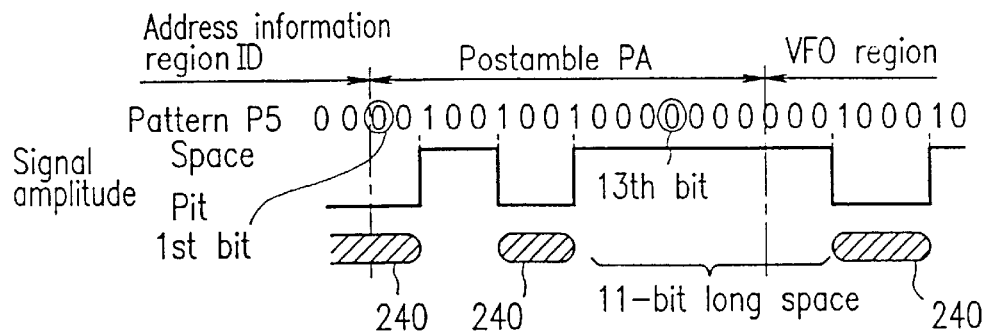
FIG. 24A  Next state : 1 or 2, ID end : Mark
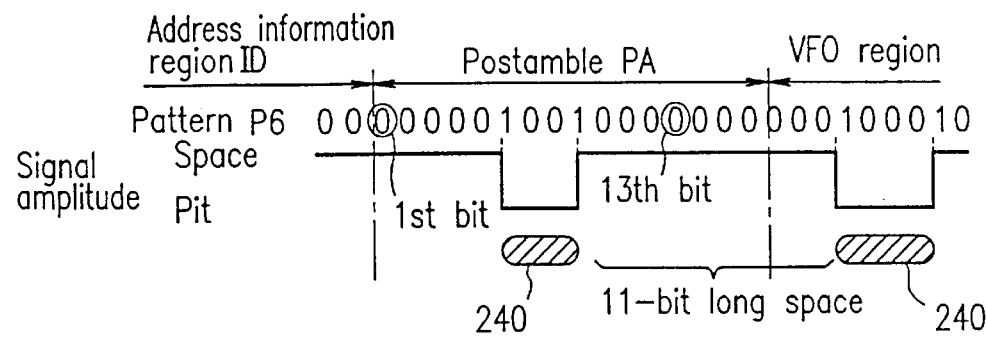
FIG. 24B  Next state : 1 or 2, ID end : Space
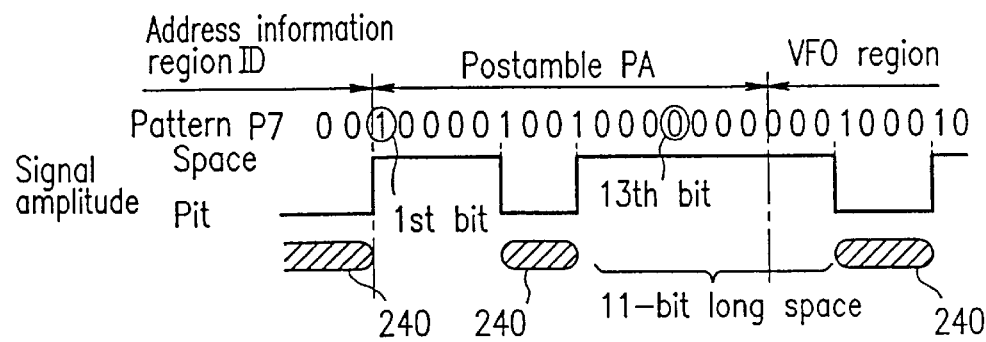
FIG. 24C  Next state : 3 or 4, ID end : Mark
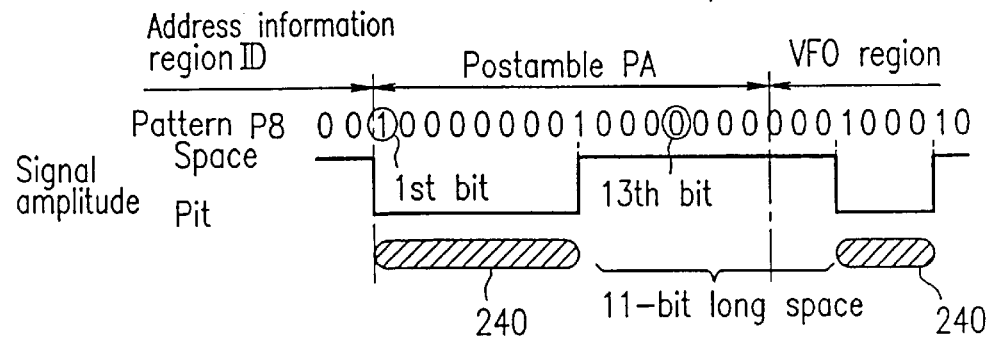
FIG. 24D  Next state : 3 or 4, ID end : Space

*FIG.24E* Next state : 1 or 2, ID end : Mark
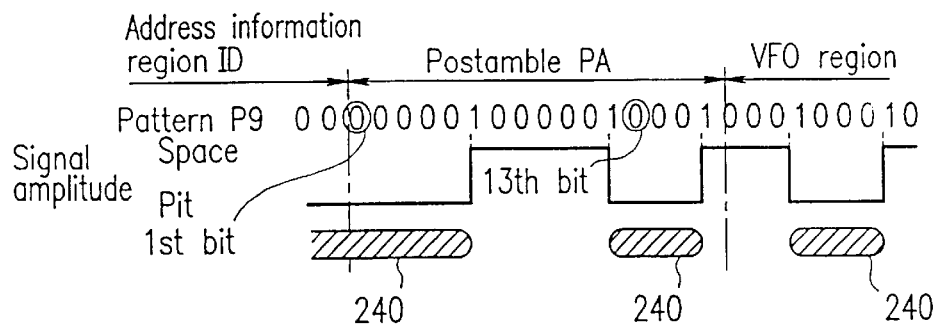
*FIG.24F* Next state : 1 or 2, ID end : Space
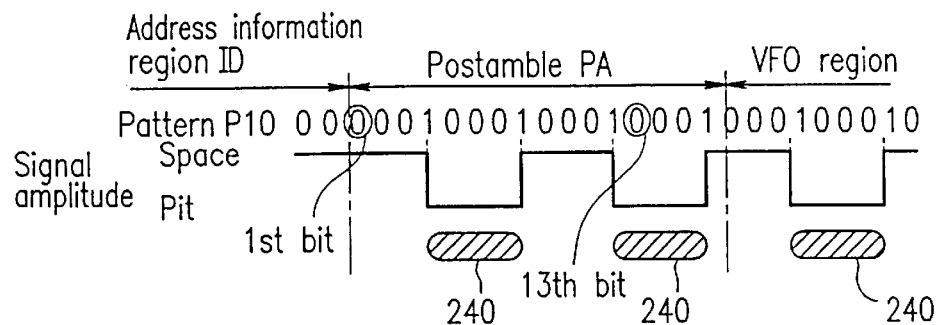
*FIG.24G* Next state : 3 or 4, ID end : Mark
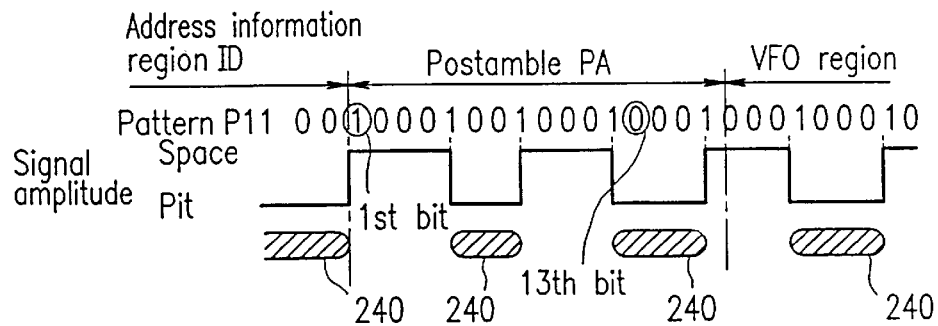
*FIG.24H* Next state : 3 or 4, ID end : Space
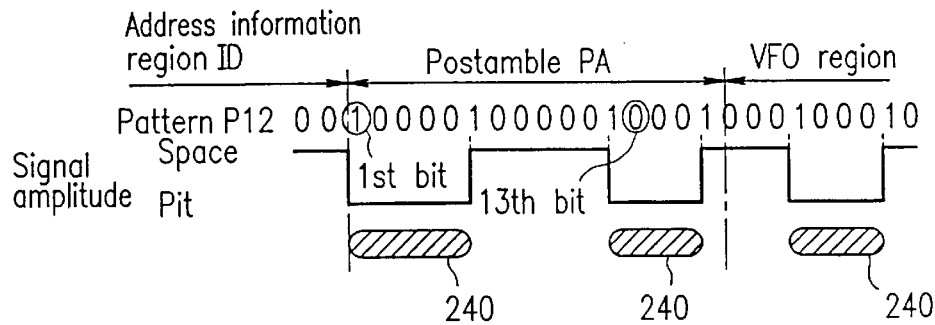

OPTICAL DISK, OPTICAL DISK DEVICE, AND METHOD OF REPRODUCING INFORMATION ON OPTICAL DISK

This is a continuation of copending U.S. application Ser. No. 09/117,825, filed Dec. 14, 1997which is a 371 of PCT/JP97/00337 filed Feb. 7, 1997.

TECHNICAL FIELD

The present invention relates to an optical disk, an optical disk device, and an optical disk reproduction method, for recording/reproducing digital signals.

BACKGROUND ART

In recent years, optical disk devices have attracted attention as means for recording/reproducing a large capacity of data, and are under active technical developments for achieving higher recording density.

Presently prevailing rewritable optical disks include spiral-shaped groove tracks composed of concave and convex portions (each having a width of about 50%) formed on a surface of a disk substrate at a pitch of 1 to 1.6 μm. On the surface of the substrate, a thin film including a recording material (e.g., Ge, Sb, and Te in the case of a phase-change type optical disk) as a component is formed by a method such as sputtering. The disk substrate is fabricated in the following manner. First, a stamper is produced from a prototype where concave grooves and pits for sector addresses and the like are formed by cutting by light beam irradiation. Using such a stamper, the disk substrates made of polycarbonate and the like are mass-produced. The rewritable optical disks require sector-unit management for data recording and reproduction. Accordingly, at the fabrication of the disks, concave and convex portions (pits) are often formed on a recording surface, simultaneously with the formation of guide grooves for tracking control, so as to record address information of each sector.

Each track of the optical disk with the above structure is irradiated with a light beam having a predetermined recording power, so as to form recording marks on the recording thin film. The portions irradiated with the light beam (the recording marks) have different optical characteristics (reflection characteristics) from the other portions of the recording thin film. Thus, the recorded information can be reproduced by irradiating the track with a predetermined reproduction power and detecting light reflected from the recording film.

In the following description, the pits of physical concave and convex portions and the recording marks obtained by a change in the optical characteristics of the recording thin film are generically referred to as "marks", unless otherwise specified. The pits are read-only marks once formed, while the recording marks are rewritable. At the reproduction of recorded information, the two types of marks are read as changes in the amplitude of reproduction signals. The concave and convex portions as used herein refers to the shapes as are viewed from a reproduction beginning of the optical disk device. In other words, the "pits" refer to the convex portions as are viewed from the reproduction head, and the "grooves" also refer to the convex portions.

Techniques for achieving an optical disk with a high recording density include increasing the recording density in the track direction and increasing the recording density in the linear velocity direction.

Increasing the recording density in the track direction includes reducing the distance between tracks (the track pitch). One technique for reducing the track pitch is land/groove recording where signals are recorded both on convex tracks (groove portions) and concave tracks (land portions). The land/groove recording realizes double recording density, compared with the case of recording signals on either the groove porions or the land portions, if the other conditions are the same.

One technique for increasing the recording density in the linear velocity direction is referred to as mark length recording where both ends of a mark are made to correspond to "1" of modulation data. FIG. 1 illustrates an example of the mark length recording in comparison with inter-mark recording. Referring to FIG. 1, a sequence Y represents digital data modulated using a run length limit code. The run length limit code as used herein refers to a code sequence where the number of continuous "0"s interposed between every adjacent "1"s (hereinbelow, called the zero run) is limited to a predetermined number. The interval (length) from one "1" to the next "1" in the sequence Y is called an inversion interval. The limits, i.e., the minimum and maximum values of the inversion interval of the sequence Y are determined by the limitation of the zero run. Such values are called the minimum inversion interval and the maximum inversion interval.

When the sequence Y is recorded using the intermark recording (PPM; pit position modulation), the "1" of the sequence Y corresponds to a recording mark 101, and the zero run corresponds to a space 102. When the sequence Y is recorded using the mark length recording (PWM; pulse width modulation), the recording state, i.e., whether the recording mark 101 or the space 102, is switched by the appearance of "1" in the sequence Y. When the mark length recording is employed, the inversion interval corresponds to the length of the recording mark 101 or the space 102.

When a run length limit code of which the minimum inversion interval is 2 or more is used, the mark length recording may have an increased number of bits per unit length, compared with the inter-mark recording. For example, consider the case where the minimum value of the physical size of a mark which can be formed on a disk (called a mark unit) is the same in both the mark length recording and the inter-mark recording. As is observed from FIG. 1, while the inter-mark recording utilizes three mark units to record data of the minimum code length (three bits, "100", in the sequence Y), the mark length recording utilizes only one mark unit. For example, while the recording density in the inter-mark recording is approximately 0.8 to 1.0 μm/bit, the recording density in the mark length recording is approximately 0.4 μm/bit.

In general, the tracks on the optical disk are divided into recording sectors which represent minimum access units. Address information is prerecorded on each recording sector as described above. By reading the address information, the access to the recording sectors for data recording/reproduction is possible.

FIG. 2A illustrates a signal format of each recording sector of a rewritable optical disk which is in accordance with ISO (see ISO/IEC 10090). A recording sector 103 begins with a header 104 where addressing information for reading address information is prerecorded by forming concave and convex portions on the recording surface. A recording field 105 stores user data where digital data is modulated using a (2,7) modulation code for the inter-mark recording. FIG. 3 shows a conversion table of (2,7) modulation codes. As is observed from FIG. 3, by the (2,7) modulation, i-bit digital data (i - 2, 3, 4) is converted into a"

2xi-bit code sequence. The (2,7) modulation codes are run length limit codes where the zero run is limited between 2 and 7.

FIG. 2B shows the construction of the header 104. A sector mark SM is provided so that the optical disk device can identify the beginning of the recording sector without clock reproduction by a phase locked loop (PLL). As shown in FIG. 2C, the sector mark SM includes a pattern using comparatively long marks. Since the sector mark SM has this predetermined pattern, and the amplitude of the reproduction signals thereof is large, the sector mark SM is distinguishable from other data recorded using the inter-mark recording. The position of the header 104 is detected by detecting the sector mark SM, thereby to reproduce the address information.

VFO regions VFO1 and VFO2 shown in FIG. 2B are provided so that the optical disk device can obtain bit synchronization of reproduction signals using a clock reproduction by the PLL. A 2-zero run sequential pattern is recorded using the inter-mark recording.

Address marks AM are provided so that the optical disk device can identify the byte synchronization of subsequent address fields ID1, ID2, and ID3. Each of the address marks AM includes a pattern as shown in FIG. 2D recorded using the inter-mark recording technique. The pattern of the address mark AM includes a pattern of $T_{max}+1=9$ bits where $T_{max}$ is a maximum inversion interval of the (2,7) modulation code ($T_{max}=8$). This pattern does not appear in data recorded by the (2,7) modulation code.

Each of the address fields ID1, ID2, and ID3 includes: address information composed of track numbers, sector numbers, and the like; and cyclic redundancy check (CRC) codes for error detection during data reproduction, which are subjected to the (2,7) modulation and recorded using the inter-mark recording.

A postamble PA is provided to indicate the end of the (2,7) modulated data in the address field ID3.

FIG. 4 shows an example of signal amplitudes obtained when information recorded on the header 104 is reproduced by the optical disk device. As is observed from FIG. 4, the amplitudes of the reproduced signals are proportional to the lengths of the corresponding marks. The amplitude of the reproduced signal of the sector mark SM which has a long length is larger than that of the reproduced signal of other data. This allows for the identification of the sector mark SM by detecting the envelope of the reproduced signal waveform, and thus the detection of the beginning of each recording sector.

In the above example, all of the (2,7) modulated data is recorded using the inter-mark recording. However, in an optical disk having the header 104, when data is recorded using the mark length recording for improving the recording density, the marks recorded in the address fields ID1 to ID3 of the header 104 and the marks recorded in the recording field 105 have a certain length determined by the zero run limitation of the modulation code. Accordingly, the amplitude of the reproduced signal of data recorded using the mark length recording becomes large, compared with that recorded using the inter-mark recording where each mark corresponds to the 1-bit long "1". In the mark length recording, therefore, the difference in the signal amplitude (or the difference in the pattern) between the sector mark SM and the other portions becomes small compared with the case of the inter-mark recording. This makes it difficult to detect the beginning of the recording sector 103 by the envelope.

Moreover, when the above-described address mark AM is used, an erroneous detection of the address mark AM due to an erroneous bit shift of "1" may occur. For example, a code sequence obtained by the (2,7) modulation of digital data { . . . 10110011 . . . } is converted into { . . . 0100100000001000 . . . } from a conversion table such as that shown in FIG. 3. At this time, the pattern of the address mark AM is {0100100000000100} as shown in FIG. 2D. If "1" of the above (2,7) modulated pattern shifts by one bit, the resultant pattern is identical to the address pattern AM,. which will cause erroneous detection.

In view of the foregoing, the objects of the present invention are to provide an optical disk, an optical disk device, and an optical disk reproduction method, where address information can be read reliably even when high recording density is achieved by employing mark length recording and the like.

DISCLOSURE OF INVENTION

The optical disk of the present invention includes a plurality of tracks each divided into a plurality of recording sectors, each of the recording sectors including a header region, wherein the header region, includes address information for identifying a position of the corresponding recording sector and address synchronous information for identifying a recording position of the address information for bit synchronization. The address information has been modulated using a run length limit code of a maximum inversion interval of $T_{max}$ bits ($T_{max}$ is a natural number), and the address synchronous information includes two patterns of which inversion interval is ($T_{max}+3$) bits or more, so that a reproduced signal of the address synchronous information is distinguished from a reproduced signal of other information. With the above construction, the above objects are attained.

In one embodiment, the address synchronous information includes a first pattern and a second pattern which are different in either a physical shape or an optical characteristic of a recording surface of the optical disk, and the address synchronous information includes one first pattern having a length of ($T_{max}+3$) bits or more and one second pattern having a length of ($T_{max}+3$) bits or more.

The pattern may be a convex portion (pit) formed physically on the recording surface of the optical disk, and the second pattern is a concave portion formed physically on the recording surface of the optical disk.

The first pattern may be a recording mark formed by changing a reflection characteristic of the recording surface of the optical disk, and the second pattern is a space on the recording surface.

Preferably, a total bit length of the first pattern included in the address synchronous information and a total bit length of the second pattern included in the address synchronous information are equal to each other.

Preferably, the header region includes four-time repetition of the address information and the address synchronous information.

The optical disk of this invention includes a plurality of tracks each divided into a plurality of recording sectors, each of the recording sectors including a header region, wherein the header region includes address information for identifying a position of the corresponding recording sector, address synchronous information for identifying a recording position of the address information for bit synchronization, and clock synchronous information for reproducing a clock signal, the address information has been modulated using a run length limit code of a minimum inversion interval of $T_{min}$ bits and a maximum inversion interval of $T_{max}$ bits ($T_{max}$ and $T_{min}$ are natural numbers satisfying $T_{max} > T_{min}$), the clock synchronous information is a sequential pattern of alternate repetition of d-bit long mark and space (d is a natural number satisfying $T_{min} \leq T_{max}$), and the address synchronous information includes two patterns of which inversion interval is ($T_{max}+3$) bits or more, so that a reproduced signal of the address synchronous information is distinguished from a reproduced signal of other information. With the above construction, the above objects are attained.

In one embodiment, each of the address synchronous information and the clock synchronous information includes a first pattern and a second pattern which are different in either a physical shape or an optical characteristic of a recording surface of the optical disk, and the address synchronous information includes one first pattern having a length of ($T_{max}+3$) bits or more and one second pattern having a length of ($T_{max}+3$) bits or more.

In another embodiment, the minimum inversion interval $T_{min}$ is 3, the maximum inversion interval $T_{max}$ is 11, and the value d is 3.

In still another embodiment, the minimum inversion interval $T_{min}$ is 3, the maximum inversion interval $T_{max}$ is 11, and the value d is 4.

Preferably, the header region includes four-time repetition of the clock synchronous information, the address information, and the address synchronous information.

The optical disk comprising a plurality of tracks each divided into a plurality of recording sectors, wherein each recording sector includes a header region and a postamble region following an end of the header region, and the postamble region includes a pattern determined based on a modulation result of data of the header region. With above construction, the above objects are attained.

In one embodiment, the data on the header region is modulated using a modulation code for performing a conversion in a table based on a state, the postamble region includes information for identifying the state.

The information for identifying the state may be at least one specific bit having a predetermined value, and a bit located adjacent to the specific bit has substantially the same value as the predetermined value of the specific bit.

The optical disk of this invention includes a plurality of tracks each divided into a plurality of recording sectors, wherein each recording sector includes a header region, a data recording region, and a postamble region following an end of the data recording region, and the postamble region includes a pattern determined based on a modulation result of data of the data recording region. With this construction, the above objects are attained.

In one embodiment, the data on the data recording region is modulated using a modulation code for performing conversion in a table based on a state, the postamble region includes information for identifying the state.

The information for identifying the state may be at least one specific bit having a predetermined value, and a bit located adjacent to the specific bit has substantially the same value as the predetermined value of the specific bit.

In one embodiment, the recording sector further includes a guard data recording region following the postamble region for recording dummy data.

In another embodiment, the data recording region includes data modulated using a run length limit code of a minimum inversion interval of $T_{min}$ bits and a maximum inversion interval of $T_{max}$ bits ($T_{max}$ and $T_{min}$ are natural numbers satisfying $T_{max} > T_{min}$), and the guard data recording region includes a pattern of alternate repetition of a k-bit long optical mark and a k-bit long optical space (k is a natural number satisfying $T_{min} \leq k \leq T_{max}$).

The optical disk of this invention includes a plurality of tracks each divided into a plurality of recording sectors, wherein each recording sector includes a header region, and the header region includes an address region having a postamble region at an end of the address region, and the postamble region has a pattern which ends with non-pit data or a space. With this construction, the above objects are attained.

The header region may include a plurality of the address regions.

The address regions may be located in the middle of groove portions and land portions of the tracks.

The optical disk of this invention includes a plurality of tracks each divided into a plurality of recording sectors, wherein each recording sector includes a header region, the header region includes a plurality of address regions, each of the address regions includes a VFO region at a beginning of the address region, and the VFO region has a pattern which starts with non-pit data or a space. With this construction, the above objects are attained.

In one embodiment, the address region includes an address information region where address information is recorded by a mark length recording for identifying a position of the corresponding recording sector, and the address information is modulated using a run length limit code of a minimum inversion interval of $T_{min}$ bits and a maximum inversion interval of $T_{max}$ bits ($T_{max}$ and $T_{min}$ are natural numbers satisfying $T_{max} > T_{min}$), and non-pit data or a space having a length in a range of $T_{min}$ bits or more and $T_{max}$ bits or less is provided between the address regions.

The address regions may be located in the middle of groove portions and land portions of the tracks.

The optical disk device of this invention is for an optical disk including a plurality of tracks each divided into a plurality of recording sectors, each recording sector including a header region and a data region, the header region including address information for identifying a position of the corresponding recording sector, address synchronous information for identifying a recording position of the address information for bit synchronization, and clock synchronous information having a predetermined sequential pattern, the device comprising: means for reading a reproduced signal from the optical disk; address reproduction means for obtaining the address information from the reproduced signal; detection means for detecting the sequential pattern of the clock synchronous information from the reproduced signal to output a detection signal; and address reproduction permit means for permitting the address reproduction means to perform a read operation of the address information based on the detection signal. With this construction, the above objects are attained.

In one embodiment, the optical disk device further includes: clock generation means for generating a clock signal from the reproduced signal; and clock reproduction permit signal for permitting the clock generation means to perform an operation of generating the clock signal based on the detection signal.

The detection means may includes: binary means for converting the reproduced signal into binary data to output the binary data; sampling means for sampling the binary data at a predetermined frequency to output digital data;

parallel conversion means for converting the digital data into parallel data of at least m×n bits (m and n are natural numbers); and a detection table for detecting a predetermined sequence composed of n-time repetition of an m-bit pattern from the parallel data.

The optical disk device of this invention is for an optical disk including a plurality of tracks each divided into a plurality of recording sectors, each recording sector including a header region and a data region, the header region including address information for identifying a position of the corresponding recording sector, address synchronous information for identifying a recording position of the address information for bit synchronization, and clock synchronous information having a predetermined sequential pattern, the device comprising: means for reading a reproduced signal from the optical disk; clock generation means for generating a clock signal from the reproduced signal; detection means for detecting the sequential pattern of the clock synchronous information from the reproduced signal to output a detection signal; and clock reproduction permit means for permitting the clock generation means to perform an operation of generating the clock signal based on the detection signal.

In one embodiment, the detection means comprises: binary means for converting the reproduced signal into binary data to output the binary data; sampling means for sampling the binary data at a predetermined frequency to output digital data; parallel conversion means for converting the digital data into parallel data of at least m×n bits (m and n are natural numbers); and a detection table for detecting a predetermined sequence composed of n-time repetition of an m-bit pattern from the parallel data.

The reproduction method of this invention is for an optical disk including a plurality of tracks each divided into a plurality of recording sectors, each recording sector including a header region and a data region, the header region including address information for identifying a position of the corresponding recording sector, address synchronous information for identifying a recording position of the address information for bit synchronization, and clock synchronous information having a predetermined sequential pattern, the method comprising the steps of: retrieving a reproduced signal from the optical disk; detecting the sequential pattern of the clock synchronous information from the reproduced signal; permitting reading of the address information if the sequential pattern is detected; reading the address information from the reproduced signal in response to the permission; and terminating the step of reading the address information in a predetermined time period after the permission to return to the step of detecting the sequential pattern. With this construction, the above objects are attained.

In one embodiment, the reproduction method further includes the steps of: permitting reproduction of a clock signal if the sequential pattern is detected; and reproducing the clock signal from the reproduced signal in response to the permission.

The reproduction method of this invention is for an optical disk including a plurality of tracks each divided into a plurality of recording sectors, each recording sector including a header region and a data region, the header region including address information for identifying a position of the corresponding recording sector, address synchronous information for identifying a recording position of the address information for bit synchronization, and clock synchronous information having a predetermined sequential pattern, the method comprising the steps of: retrieving a reproduced signal from the optical disk; detecting the sequential pattern of the clock synchronous information from the reproduced signal; permitting reproduction of a clock signal if the sequential pattern is detected; and reproducing the clock signal from the reproduced signal in response to the permission. With this construction, the above objects are attained.

The reproduction method of this invention is for an optical disk including a plurality of tracks each divided into a plurality of recording sectors, each recording sector including a header region and a data region, the header region including address information for identifying a position of the corresponding recording sector, address synchronous information for identifying a recording position of the address information for bit synchronization, and clock synchronous information having a predetermined sequential pattern, the method comprising the steps of: retrieving a reproduced signal from the optical disk; determining a reproduction mode whether the reproduction mode is an initial mode during a time period from switching-on of the device or a track jump until the address information is first read from the reproduced signal or a normal mode during a time period from the reading of the address information until a next track jump is generated; detecting the sequential pattern of the clock synchronous information from the reproduced signal; permitting reading of the address information if the sequential pattern is detected in the initial mode as a first permitting step; reading the address information from the reproduced signal in response to the permission; generating a sector pulse if the address information is correctly read; permitting reading of the address information from the reproduced signal based on the sector pulse in the normal mode as a second permitting step; and terminating the reading of the address information to return to the step of determining a reproduction mode if the address information fails to be read within a predetermined time period after either the first or second permission step. With this construction, the above objects are attained.

BRIEF DESCRIPTION OF DRAWINGS

FIG. 2A is a view illustrating a signal format of a recording sector of a conventional optical disk.

FIG. 2B is a view illustrating a header of the conventional optical disk.

FIG. 2C is a view illustrating a recording pattern of a sector mark of the conventional optical disk.

FIG. 2D is a view illustrating a recording pattern of an address mark of the conventional optical disk.

FIG. 6 is a view illustrating an exemplary recording pattern of a VFO region of the optical disk of the example according to the present invention.

FIG. 9 is a view illustrating an exemplary recording pattern of the address mark of the optical disk of the example according to the present invention.

FIG. 13 is a timing chart of exemplary waveforms of various signals used in the optical disk device of the example according to the present invention.

FIG. 14 is a timing chart of exemplary waveforms of various signals used in the optical disk device of the example according to the present invention.

FIG. 16 is a flowchart of an exemplary process of the system control of the optical disk device of the example according to the present invention.

FIG. 17A is a view illustrating a signal format of a recording sector of an optical disk of another example according to the present invention.

FIG. 17B is a view illustrating a signal format of a header region of the optical disk of the example according to the present invention.

FIG. 18A is a block diagram of a modulation circuit for a state modulation code in the example according to the present invention.

FIG. 18B is a view illustrating an exemplary content of a conversion table shown in FIG. 18A.

FIG. 18C is a block diagram of the construction of a demodulation circuit for the state modulation code in the example according to the present invention.

FIGS. 20A to 20C are views for explaining the construction of an optical disk of still another example according to the present invention.

FIGS. 24A to 24H are views illustrating exemplary patterns of a postamble.

BEST MODE FOR CARRYING OUT THE INVENTION

Hereinbelow, the present invention will be described by way of example with reference to the relevant drawings.

(EXAMPLE 1)

Figure 1:
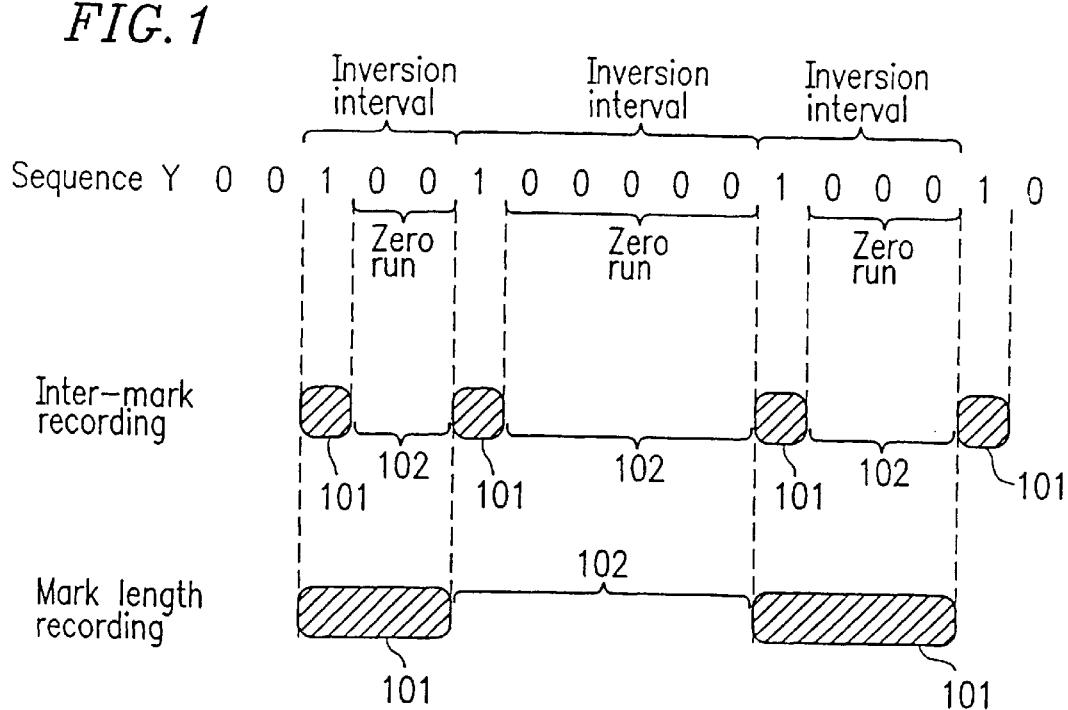
FIG. 1 is a view for explaining the mark length recording and the inter-mark recording.
Figures 3, 4:
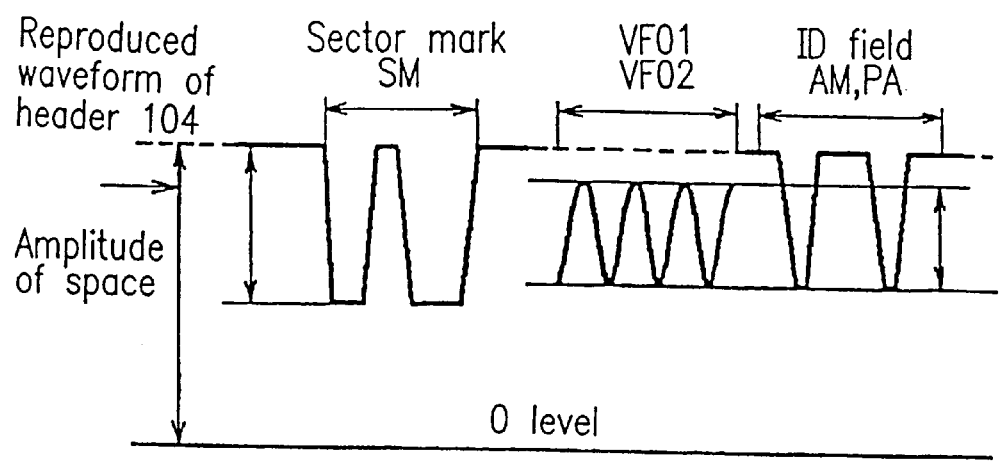
FIG. 3 illustrates a modulation table of (2,7) modulation codes.
FIG. 4 is a view illustrating an example of reproduced signal waveforms at the header of the conventional optical disk.
Figure 5A:
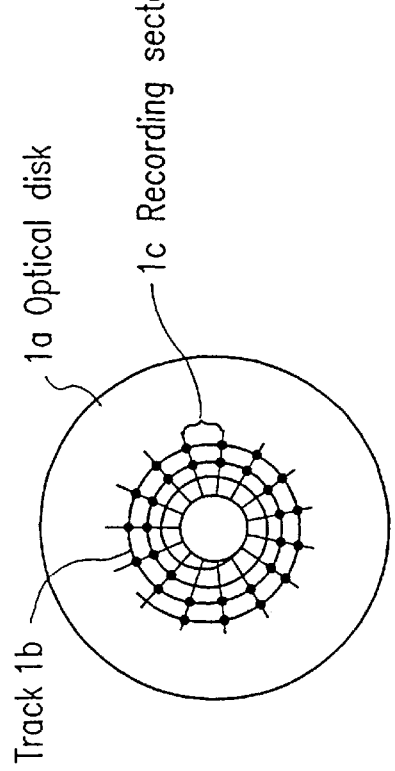
FIGS. 5A to 5C are views for explaining a construction of an optical disk of one example according to the present invention.

FIG. 5A schematically illustrates an optical disk 1a of the first example according to the present invention. As shown in FIG. 5A, the optical disk 1a has tracks 1b formed in a spiral shape. Each track 1b is divided into recording sectors 1c in accordance with a predetermined physical format. As shown in FIG. 5A, the recording sectors 1c are sequentially arranged in the circumferential direction to form the track 1b.

Figure 5B:
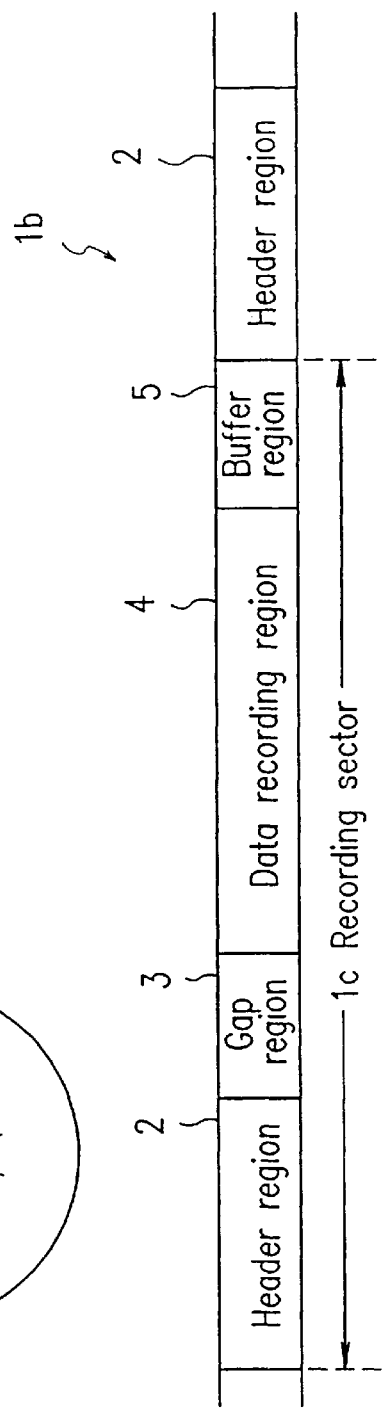

FIG. 5B illustrates a format of each recording sector 1c of the optical disk 1a of the first example according to the present invention. Referring to FIG. 5B, the recording sector 1c starts with a header region 2 where addressing information for reading address information is prerecorded. A gap region 3, a data recording region 4, and a buffer region 5 respectively follow the header region 2 in this order. The gap region 3 has no data recorded thereon, but is used for power control of a semiconductor laser used for data recording/reproduction and the like. The data recording region 4 is used to record user data. Redundant data such as an error correction code is added to the user data, to form digital data. The digital data is modulated using a run length limit code where the zero run is limited to the range of 2 to 10. The modulated data is recorded on the data recording region 4 using the mark length recording. Such a run length limit code is called the (2,10) modulation code. The buffer region 5 is provided to absorb a rotational fluctuation of the optical disk and the like. In the header region 2, information may be recorded as pits in a concave and convex shape on the recording surface, or as marks optically recorded in substantially the same manner as that used in the recording on the data recording region.

Figure 5C:
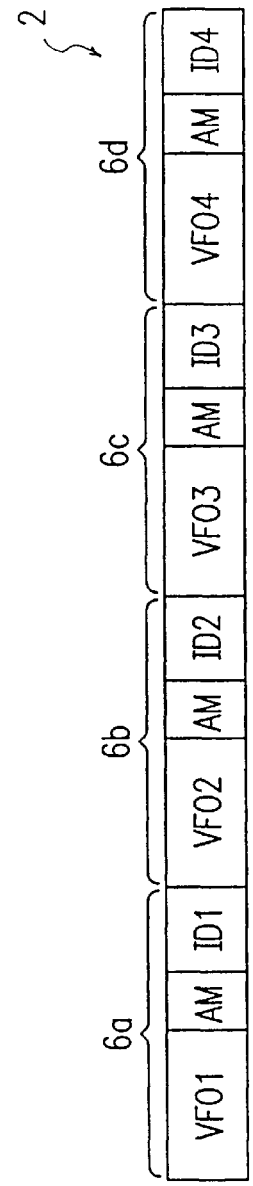

As shown in FIG. 5C, the header region 2 is divided into four address regions 6a, 6b, 6c, and 6d. Each of the address regions includes a VFO region, an address mark AM, and an address information region ID. For example, the address region 6a includes a VFO region VF01, an address mark AM, and an address information region ID1, while the address region 6b includes a VFO region VF02, an address mark AM, and an address information region ID2.

In the conventional header 104 shown in FIG. 2B, the sector mark SM precedes the pattern composed of the VFO region, the address mark AM, and the address field ID which is repeated three times. In this example, no sector mark is recorded on each header region 2, but the address region, similar to the above pattern, which is composed of the VFO region, the address mark AM, and the address information region ID, is repeated four times.

The VFO regions VF01, VF02, VF03, and VF04 are used so that an optical disk device can obtain clock reproduction from reproduced signals. As shown in FIG. 6, each VFO region has such a sequential pattern that includes 4-bit long marks and 4-bit long spaces appearing alternately. Each of the VFO regions may have the same length or different lengths. For example, if the VFO region VF01 is made longer than the other VFO regions VF02, VF03, and VF04, stable clock reproduction is obtained at the beginning of the header region 2.

Figure 7A:
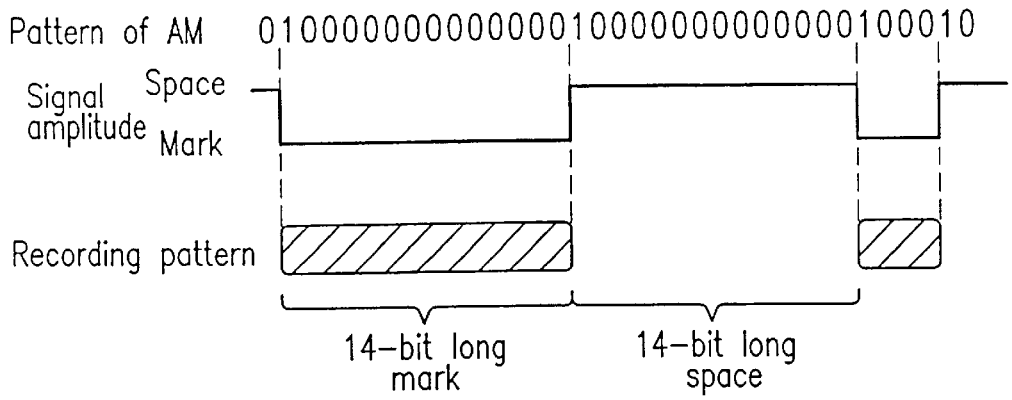
FIGS. 7A to 7C are views illustrating exemplary recording patterns of an address mark of the optical disk of the example according to the present invention.

Each address mark AM is provided so that the optical disk device can identify the position of the subsequent address information region ID to obtain bit synchronization therewith. FIG. 7A shows an example of the address mark AM of this example. As shown in FIG. 7A, marks are recorded on the optical disk using the mark length recording in accordance with the signal sequence (bit pattern) of the address mark AM. The resultant signal to be read has an amplitude in accordance with the pattern of marks and spaces (portions other than the marks). In this example, the address mark AM has a pattern which includes one 14-bit long mark and one 14-bit long space. The address information regions ID1, ID2, ID3, and ID4 are representatively denoted as an address information region ID.

With respect to the address information region ID, digital data composed of data including address information such as the track number and the sector number and a predetermined error detection code added thereto are recorded using the mark length recording, after the digital data are modulated using a (2,10) modulation code.

Since the maximum inversion interval of the (2,10) modulation code is 11, no marks or spaces having a length of 12 bits or more are included in the pattern in any of the address information regions ID and the data recording regions. Even if the 11-bit long mark in the address information region ID or the data recording region is erroneously reproduced as a 12-bit long mark due to an edge shift of the mark or the like, and furthermore the 14-bit long mark in the address mark AM is erroneously reproduced as a 13-bit long mark, the one-bit long difference still exists therebetween. Accordingly, unless the mark/space in either one of the regions is subjected to an edge shift by 2 or more bits, a failure to detect the 14-bit long mark in the address mark AM or an erroneous detection of a pattern in the address information region ID or the data recording region as a 14-bit long mark will not occur. In this way, the address mark AM can be detected without fail by recording two patterns (one mark and one space) having a length of $T_{max}+3$ bits or more where $T_{max}$ is the maximum inversion interval.

As described above, the address mark AM includes two 14-bit long mark/spaces. This pattern reduces the probability of erroneous detection compared with a pattern including only one 14-bit long mark or space. Moreover, the pattern including only one 14-bit long mark or space can be used as a data synchronization detection pattern for the data recording region 4. This makes it possible, not only to maintain the reliability of the data synchronization detection, but also to facilitate prevention of the data synchronization detection pattern from being erroneously detected as the address mark AM.

Figure 7B:
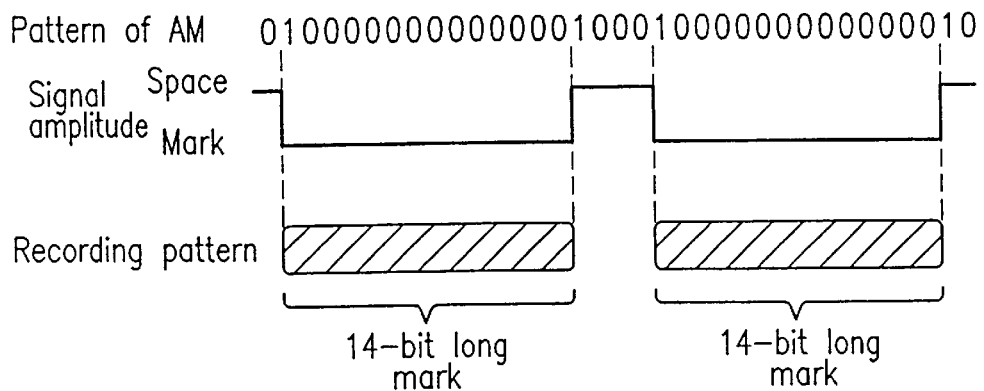
Figure 7C:
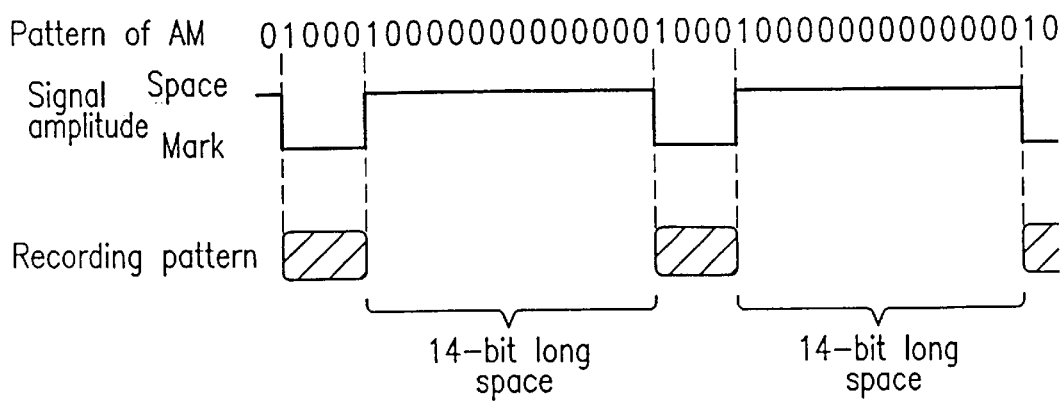
Figure 8A:
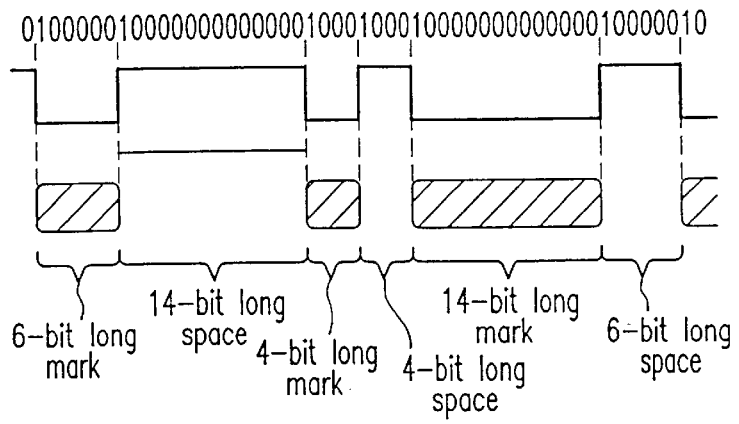
FIGS. 8A to 8D are views illustrating exemplary recording patterns of the address mark of the optical disk of the example according to the present invention.
Figure 8B:
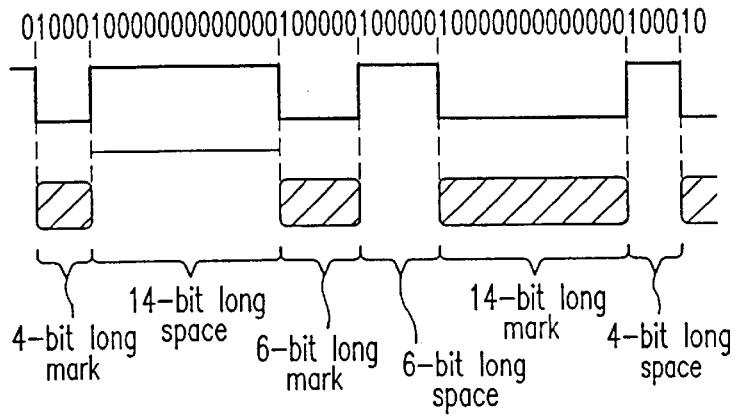
Figure 8C:
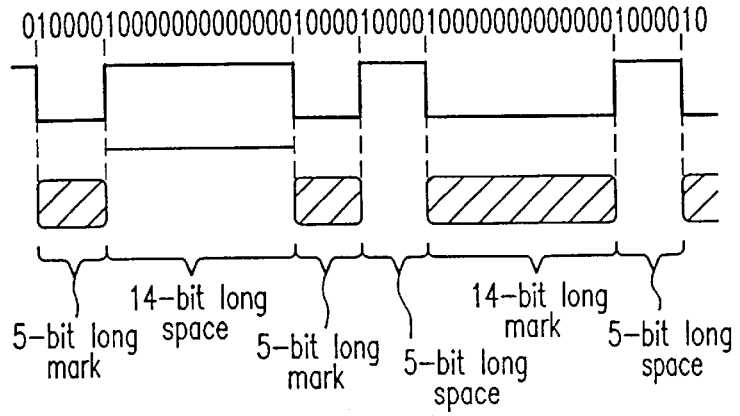
Figure 8D:
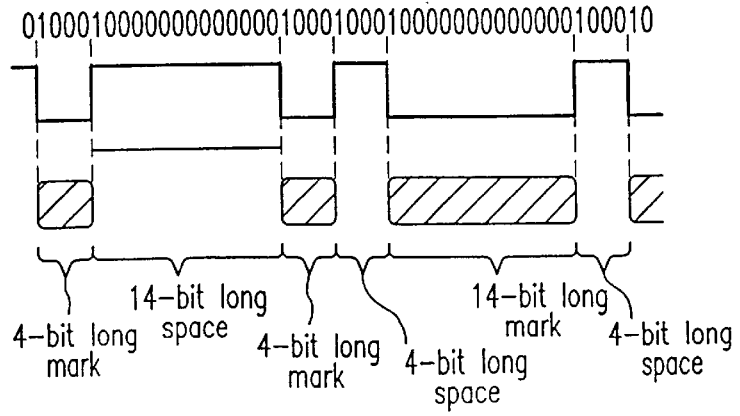

FIGS. 7B and 7C illustrate other examples of the address mark AM. A pattern including two 14-bit long marks as shown in FIG. 7B and a pattern including two 14-bit long spaces as shown in FIG. 7C may be used as the address mark AM. Using the patterns as shown in FIGS. 7B and 7C, however, the entire recording pattern may be made one-sided in the balance of marks and spaces. If the entire recording pattern becomes one-sided, the low-frequency component of the pattern increases. The increase of the low-frequency components of the pattern varies the amount of the reproduced signal components in the servo frequency band, which affects the servo system. Accordingly, the amount of the low-frequency component of the pattern should preferably be as small as possible. Thus, the pattern as shown in FIG. 7A is preferable where the appearance of the marks and the spaces is balanced.

FIGS. 8A to 8D illustrate yet other examples of the address mark AM. The address mark AM shown in FIG. 8A has a pattern composed of (6-bit long mark, 14-bit long space, 4-bit long mark, 4-bit long space, 14-bit long mark, 6-bit long space). The address mark AM shown in FIG. 8B has a pattern composed of {4-bit long mark, 14-bit long space, 6-bit long mark, 6-bit long space, 14-bit long mark, 4-bit long space}. The address mark AM shown in FIG. 8C has a pattern composed of (5-bit long mark, 14-bit long space, 5-bit long mark, 5-bit long space, 14-bit long mark, 5-bit long space). The address mark AM shown in FIG. 8D has a pattern composed of (4-bit long mark, 14-bit long space, 4-bit long mark, 4-bit long space, 14-bit long mark, 4-bit long space).

In all of the above patterns, the total number of bits of the marks and the total number of bits of the spaces are equal to each other. Thus, these patterns include two 14-bit long mark/spaces and also include a reduced amount of low-frequency components.

In the patterns shown in FIGS. 8A to 8D, the number of mark/space inversions is large compared with the patterns shown in FIGS. 7A to 7C. As the number of mark/space inversions increases, edge information in increases and thus the error due to a bit shift occurs less easily. In other words, the patterns shown in FIGS. 8A to 8D have a smaller probability of causing erroneous synchronization detection due to a bit shift than the patterns shown in FIGS. 7A to 7C.

In some cases, the processing of a modulation circuit, a demodulation circuit, and the like becomes simpler if the address mark AM has a length of an integer number of data bytes. FIG. 9 illustrates a pattern of the address mark AM obtained by using a modulation code which modulates one data byte into 16 bits. The address mark AM is 48-bit long, i.e., 3-data byte long. The pattern is composed of (4-bit long space, 4-bit long mark, 14-bit long space, 4-bit long mark, 4-bit long space, 14-bit long mark, 4-bit long space).

The pattern of the address mark AM shown in FIG. 9 includes a larger number of mark/space inversions than the pattern shown in FIG. 7A. As the number of mark/space inversions increases, edge information increases and thus the error due to a bit shift occurs less easily as described above. In other words, the pattern shown in FIG. 9 has a smaller probability of causing erroneous synchronization detection due to a bit shift than the pattern shown in FIG. 7A.

Figure 10:
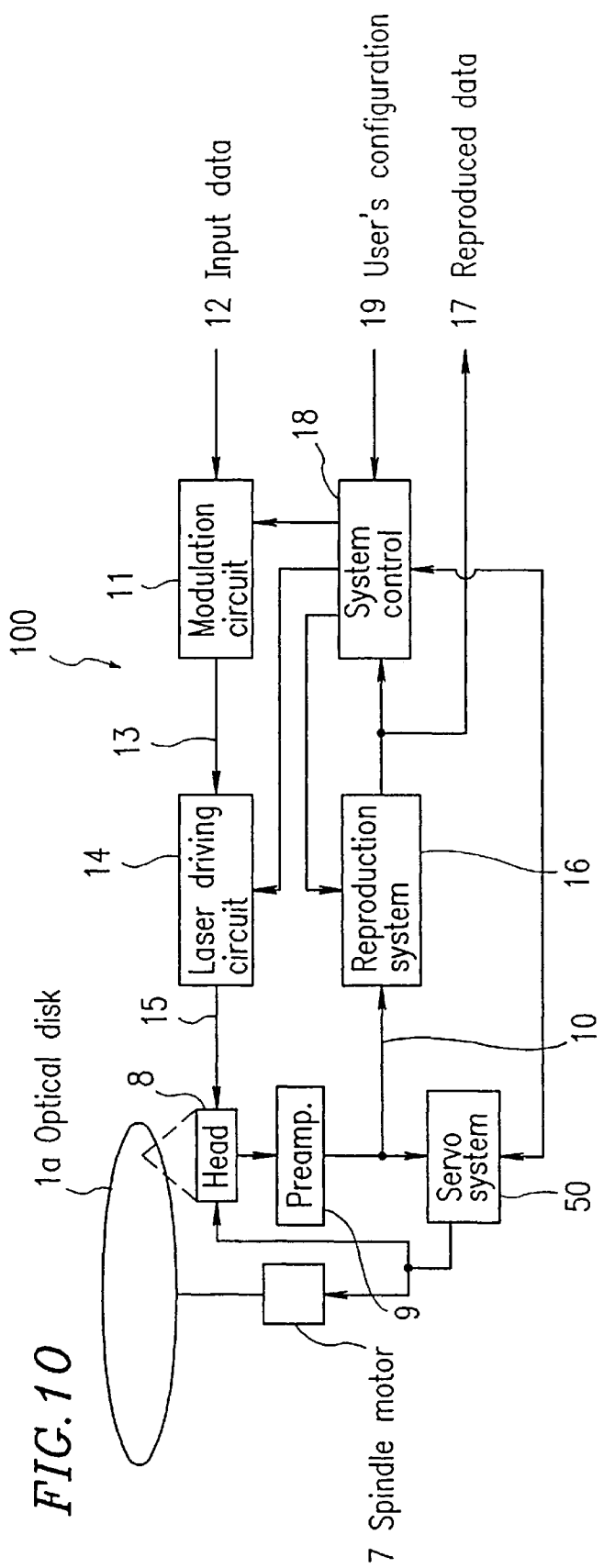
FIG. 10 is a block diagram of an optical disk device of one example according to the present invention.

FIG. 10 is a block diagram of an optical disk device 100 for recording/reproducing data on/from the optical disk 1a having the signal format described above. Referring to FIG. 10, the optical disk device 100 includes a spindle motor 7, a head 8, a preamplifier 9, a modulation circuit 11, a laser driving circuit 14, a reproduction system 16, a system control 18, and a servo system 50.

The spindle motor 7 rotates the optical disk 1a at a predetermined number of revolutions. The head 8 incorporates a semiconductor laser, an optical system, an optical detector, and the like therein though these components are not shown. Laser light emitted by the semiconductor laser is converged by the optical system so that a light spot having a predetermined power for recording or reproduction is formed on a recording surface of the optical disk 1a to realize data recording/reproduction. Reflected light from the recording surface is converged by the optical system and converted into a current by the optical detector. The signal current output from the head 8 is further converted into a voltage and amplified by the preamplifier 9, so as to be output as a reproduced signal 10.

The servo system 50 performs the rotational control of the spindle motor 7, the phase control for moving the head 8 in the radial direction of the optical disk1*a*, the focusing control for focusing the light spot on the recording surface of the optical disk1*a*, and the tracking control for tracking the light spot along the center of the track.

The modulation circuit 11 performs the (2,10) modulation for input data 12, and outputs modulated data 13 to the laser driving circuit 14. During the reproduction, the laser driving circuit 14 outputs a laser driving signal 15 for driving the semiconductor laser incorporated in the head 8 to emit light with the power for reproduction. During the recording, the laser driving circuit 14 outputs the laser driving signal 15 for driving the semiconductor laser to emit light with the power for recording so that the mark length recording is performed on the data recording region 4 in accordance with the supplied modulated data 13.

The reproduction system 16 reproduces various data recorded on the header region 2 and the data recording region 4 from the reproduced signal 10 supplied from the preamplifier 9, and outputs the data as reproduced data 17.

The system control 18 controls the operations of the modulation circuit 11, the laser driving circuit 14, the reproduction system 16, and the servo system 50 based on the reproduced data 17 reproduced by the reproduction system 16 and a user's configuration 19.

Figure 11:
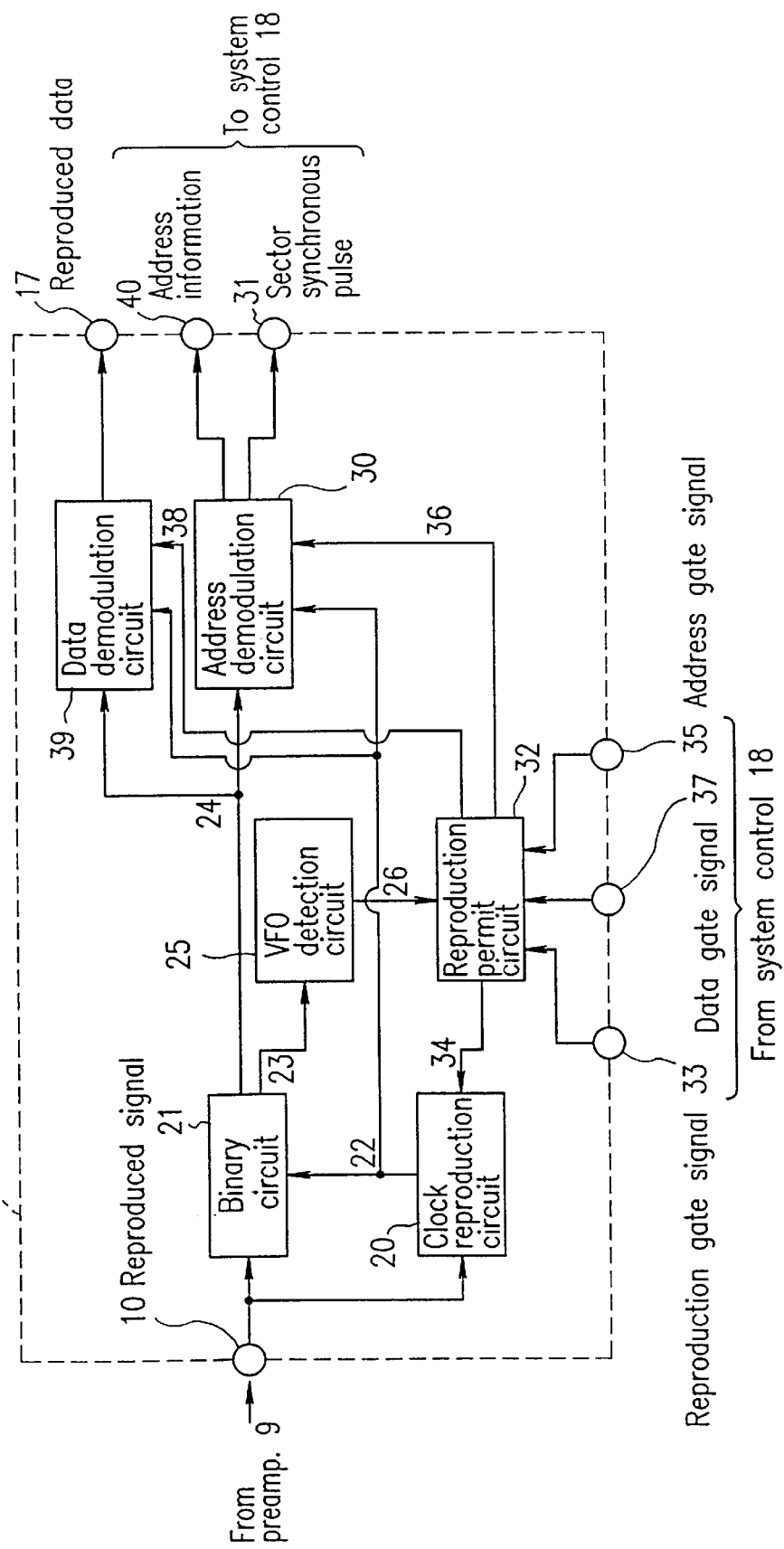
FIG. 11 is a block diagram of an exemplary inner construction of a reproduction system shown in FIG. 10.

FIG. 11 is a block diagram illustrating an example of the internal construction of the reproduction system 16. Hereinbelow, the method for reproducing address information 40 recorded on the header region 2 from the reproduced signal 10 will be described. As shown in FIG. 11, the reproduction system 16 includes a clock reproduction circuit 20, a binary circuit 21, a VFO detection circuit 25, a reproduction permit circuit 32, an address demodulation circuit 30, and a data demodulation circuit 39.

The reproduced signal 10 received from the preamplifier 9 is input into the clock reproduction circuit 20 and the binary circuit 21. The clock reproduction circuit 20 includes a PLL for generating a reproduction clock 22 synchronized with the reproduced signal 10 in frequency and phase. The binary circuit 21 equalizes the waveform of the reproduced signal 10 as required, to convert the signal into a binary pattern composed of "1" and "0". The binary circuit 21 outputs the converted pattern itself to the VFO detection circuit 25 as asynchronous binary data 23, and simultaneously synchronizes the converted binary pattern with the reproduction clock 22 supplied from the clock reproduction circuit 20 to output as synchronous binary data 24. The synchronous binary data 24 is supplied to the address demodulation circuit 30 and the data demodulation circuit 39.

The VFO detection circuit 25 detects the sequential patterns recorded on the VFO regions VF01, VF02, VF03, and VF04 based on the asynchronous binary data 23, and outputs a VFO detection pulse 26 if predetermined sequential patterns are detected.

Figures 12A, 12B:
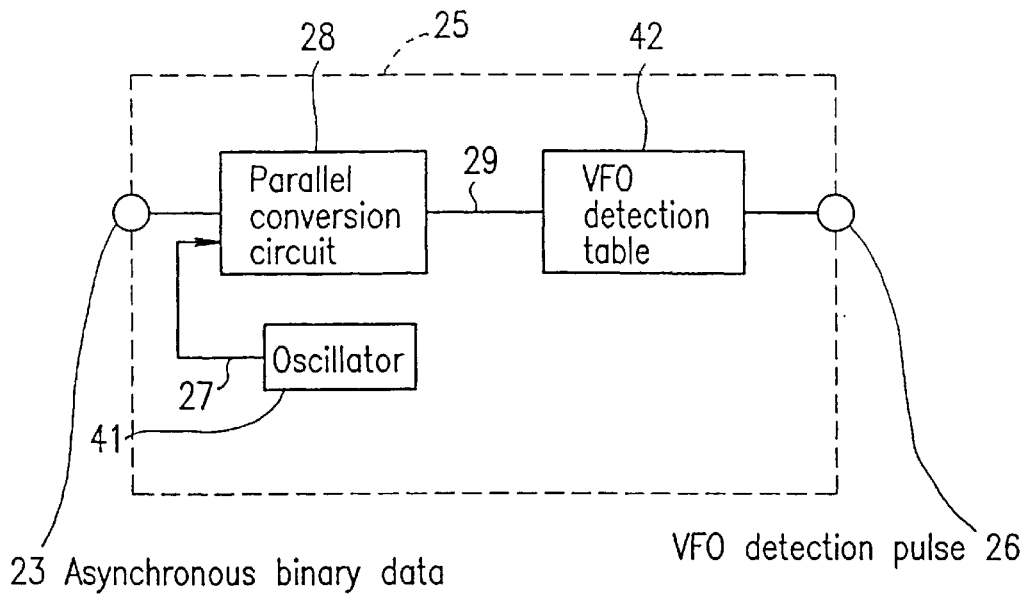
FIG. 12A is a block diagram of an exemplary inner construction of a VFO detection circuit of the example according to the present invention.
FIG. 12B is a view illustrating the construction of a VFO detection table in the example according to the present invention.

FIG. 12A illustrates an example of the internal construction of the VFO detection circuit 25. As shown in FIG. 12A, the VFO detection circuit 25 includes a parallel conversion circuit 28, an oscillator 41, and a VFO detection table 42.

The parallel conversion circuit 28 receives the asynchronous binary data 23 and a fixed clock 27 generated by the oscillator 41. The parallel conversion circuit 28 latches the asynchronous binary data 23 at the timing of the fixed clock 27 and converts the asynchronous binary data 23 into parallel data 29 corresponding to continuous 32 clocks. The converted parallel data 29 is input into the VFO detection table 42.

The VFO detection table 42 is, for example, composed of a table as shown in FIG. 12B which provides one-bit output from 32-bit input. The VFO detection table 42 outputs the VFO detection pulse 26 of "1" if the parallel data 29 sequentially input at the timing of the fixed clock 27 is a pattern composed of four-time repetition of an 8-bit pattern, {11110000} or {00001111}, or a pattern similar to this pattern. Otherwise, the VFO detection pulse 26 is "0".

The first two lines of patterns in the VFO detection table shown in FIG. 12B are detection patterns which are obtained when the frequency of the fixed clock 27 is substantially equal to the frequency of the reproduction clock and completely match with the 4-bit long mark/space repetition pattern, i.e., the recording pattern of the VFO region. The other patterns in the third and subsequent lines are more or less different from the recording pattern of the VFO region. These patterns are provided so that patterns can be detected even in the case where the amplitude of the reproduced signal 10 varies or in the case where the frequency of the fixed clock 27 and the frequency of the reproduction clock become more or less different from each other due to a rotational fluctuation of the optical disk 1*a*.

By using the VFO detection circuit 25 with the above internal construction, the-signals recorded on the VFO region can be detected with the fixed clock 27 corresponding to the frequency of a clock reproduced when the optical disk 1*a* is rotating at a predetermined number of revolutions.

In this example, the parallel data 29 corresponding to 32 clocks are used for the detection of four periods of the 4-bit long mark/space pattern. The number of bits of the parallel data 29 is not limited to this number. An optimal number of bits may be selected so that an erroneous detection and an omission of detection are minimized. The frequency of the fixed clock 27 is not limited to the above-mentioned value. For example, if the frequency of the fixed clock is made to correspond to a quarter of the frequency of the reproduction clock, the pattern, {10101010} or {01010101} can be detected as the VFO pattern.

The VFO detection circuit 25 is not limited to the circuit having the internal construction shown in FIG. 12A. For example, since the sequential pattern includes a specific frequency component, such a specific frequency component may be detected directly from the reproduced signal 10 to detect the sequential pattern.

The address demodulation circuit 30 detects the address mark AM using the synchronous binary data 24 and the reproduction clock 22, performs the (2,10) demodulation for the modulated data recorded on the subsequent address information regions ID1, ID2, ID3, and ID4, and detects an error in the demodulated data.

In this example, as described above, each header region 2 is composed of four repeated address regions each including the VFO region, the address mark AM, and the address information region ID. Accordingly, when address information is successfully reproduced without an error from two or more address information regions among the four address information regions ID1, ID2, ID3, and ID4, the reproduced values are output to the system control 18 as the address information 40. The address demodulation circuit 30 also outputs a sector synchronization pulse 31 simultaneously with the output of the address information 40.

The four repeated recordings on the address regions will now be described. The error rate for one address is about $10^{-2}$. Assuming that the address information is obtained (the address is readable) when at least two address regions among the four address regions are successfully reproduced, the probability of failing to obtain the address information is as follows.

$$_4C_3 \times (10^{-2})^3 \times (1-10^{-2}) + (10^{-2})^4 \approx 4 \times 10^{-6}$$

wherein "$_4C_3$" is the number of combinations of three from four. Since one optical disk includes about $10^6$ recording sectors, the number of recording sectors in which an address is not readable in one optical disk is $10^6 \times (4 \times 10^6) = 4$, which is within an allowable range. Thus, in this example, the number of recording sectors in which addresses are not readable is substantially reduced to less than 10. This facilitates the identification of each recording with an extremely high probability. As a result, each recording sector can be identified by reliably retrieving the address information from the address regions of the header of each recording sector, without the necessity of providing a sector mark SM for identifying the header at the start of the header.

For comparison, the conventional header 104 (FIG. 2B) including three address regions will be described. Assuming that the address is readable (the address information is obtained) when at least two address regions among the three address regions are successfully reproduced, the probability of failing to obtain the address information is as follows.

$$_3C_2 \times (10^{-2})^2 \times (1-10^{-2}) + (10^{-2})^3 \approx 3 \times 10^{-4}$$

wherein "$_3C_2$" is the number of combinations of two from three. Since one optical disk includes about $10^6$ recording sectors, the number of recording sectors in which an address is not readable in one optical disk is $10^6 \times (3 \times 10^4) = 300$, which is too large to be allowable.

Returning to FIG. 11, the reproduction permit circuit 32 generates a clock reproduction permit signal 34 based on the VFO detection pulse 26 supplied from the VFO detection circuit 25 and a reproduction gate signal 33 supplied from the system control 18, and outputs the signal to the clock reproduction circuit 20. The clock reproduction circuit 20 generates the reproduction clock 22 by synchronizing the incorporated PLL with the phase of the reproduced signal 10 and outputs the reproduction clock to the binary circuit 21 only when the input clock reproduction permit signal 34 is "1".

The reproduction permit circuit 32 also generates an address reproduction permit signal 36 based on the VFO detection pulse 26 and an address gate signal 35 from the system control 18, and outputs the signal to the address demodulation circuit 30. The address demodulation circuit 30 detects the address mark AM by identifying the pattern of the address mark AM in the above-described manner only when the input address reproduction permit signal 36 is "1".

The reproduction permit circuit 32 further generates a data reproduction permit signal 38 based on the VFO detection pulse 26 and a data gate signal 37 from the system control 18, and outputs the signal to the data demodulation circuit 39. The data demodulation circuit 39 demodulates recorded data read from the data recording region 4 among the synchronous binary data 24 and outputs the reproduced data 17 only when the input data reproduction permit signal 38 is "1".

The system control 18 outputs the reproduction gate signal 33, the address gate signal 35, and the data gate signal 37 at a timing in accordance with the information format shown in FIGS. 5B and 5C (i.e., the reproduced signal format) using the sector synchronization pulse 31 supplied from the address demodulation circuit 30 of the reproduction system 16 as the reference. These signals are supplied to the reproduction permit circuit 32 of the reproduction system 16 as described above (FIG. 11).

FIG. 13 illustrates exemplary waveforms of the sector synchronization pulse 31, the reproduction gate signal 33, the address gate signal 35, and the data gate signal 37 to show the relationship between these signals.

Referring to FIG. 13, the reproduced signal format conforms to the information recording format shown in FIG. 5B. The header region 2, the gap region 3, and the data recording region 4 of a recording sector 1A are called a header region 2a, a gap region 3a, and a data recording region 4a. Likewise, the header region 2, the gap region 3, and the data recording region 4 of a recording sector 1B following the recording sector 1A are called a header region 2b, a gap region 3b, and a data recording region 4b.

In the recording sector 1A, when the address information is correctly reproduced from the header region 2a, the sector synchronization pulse 31 becomes "1" (high level) somewhere in the range from the end of the header region 2a through the gap region 3a. The reproduction gate signal 33 becomes "1" over the range at least covering the data recording region 4a of the recording section 1A and the header region 2b of the next recording sector 1B. The address gate signal 35 becomes "1" over the range at least covering the header region 2b of the next recording sector 1B. The data gate signal 37 becomes "1" over the range substantially covering the data recording region 4a of the recording sector 1A.

The system control 18 may be constructed so as to first examine the contents of the address information 40 together with the sector synchronization pulse 31 and determine whether or not the recording sectors 1A and 1B have address information to be recorded or reproduced before setting the respective gate signals to "1" in accordance with the timing described above.

FIG. 14 illustrates exemplary waveforms of the VFO detection pulse 26, the sector synchronization pulse 31, the reproduction gate signal 33, the clock reproduction permit signal 34, the address gate signal 35, the address reproduction permit signal 36, the data gate signal 37, and the data reproduction permit signal 38, shown in correspondence with the signal format.

Referring to FIG. 14, it is assumed that an information address is first correctly reproduced from the recording sector 1A and that the data recording regions 4a and 4b of the recording sectors 1A and 1B have no data recorded thereon but a data recording region 4c of a next recording sector 1C has data thereon. Also assumed is that the beginning of the data recording region 4c includes a sequential pattern substantially equal to that on the VFO region, which is composed of 4-bit long marks and spaces appearing alternately.

The clock reproduction permit signal 34 is "1" for a predetermined time period after the VFO detection pulse 26 of "1" appears. The clock reproduction permit signal 34 is also "1" over the time period when the reproduction gate signal 33 is "1". The above predetermined time period is at least equal to the time period required to read the address marks AM and the address information regions ID1, ID2, ID3, and ID4 of the header region 2. As a result, when the VFO detection pulse 26 becomes "1" for the respective VFO regions of the recording sector 1A, the clock reproduction permit signal 34 remains "1" until at least the end of the header region 2a. When the address information has been correctly reproduced in the recording sector 1A and the sector synchronization pulse 31 is output, the clock reproduction permit signal 34 becomes "1" for the header region 2b of the next recording sector 1B without fail. Likewise, when the address information has been correctly reproduced in the recording sector 1B and the sector synchronization pulse 31 is output, the clock reproduction permit signal 34 becomes "1" for the header region 2c of the next recording sector 1C without fail.

The address reproduction permit signal 36 is "1" for a predetermined time period after the VFO detection pulse 26 becomes "1 " and for a time period when the address gate signal 35 is "1". The above predetermined time period is set to at least equal to the total time period required to read information from the address marks AM and the address information regions ID1, ID2, ID3, and ID4. As a result, when the VFO detection pulse becomes "1" for the respective VFO regions of the recording sector 1A, the address reproduction permit signal 36 remains "1" until at least the end of the header region 2a. When the address information has been correctly reproduced in the recording sector 1A and the sector synchronization pulse 31 is output, the address reproduction permit signal 36 becomes "1" for the header region 2b of the next recording sector 1B without fail. Likewise, when the address information has been correctly reproduced in the recording sector 1B and the sector synchronization pulse 31 is output, the address reproduction permit signal 36 becomes "1" for the header region 2c of the next recording sector 1C without fail.

The data reproduction permit signal 38 becomes "1" if the data gate signal 37 is "1" when the VFO detection pulse 26 rises to "1I", and remains "1" until the data gate signal 37 becomes "0". The data reproduction permit signal 38 remains "0" if the data gate signal 37 is "0" when the VFO detection pulse 26 rises to "1". As a result, since the VFO detection pulse 26 does not become "1" for the date recording regions 4a and 4b where no data has been recorded, the data reproduction permit signal 38 remains "0". For the data recording region 4c where data has been recorded, the VFO detection pulse becomes "1 " at the header portion thereof. Accordingly, the data reproduction permit signal 38 becomes " 1" at a predetermined timing.

Thus, by using the VFO detection circuit 25 and the reproduction permit circuit 32, the clock reproduction and the reproduction of the address information are permitted in the header region 2 so that the clock signal and the address information can be read. As described above, the sector synchronization pulse 31 is output after the address information is reproduced from the header region 2 (see FIG. 13). According to the present invention, therefore, the address information of the recording sector can be read even in the state where the time reference by the sector synchronization pulse 31 is not available.

Also, by using the system control 18, the address demodulation circuit 30, and the reproduction permit circuit 32, once address information has been reproduced from one recording sector (e.g., the recording sector 1A) without an error, the clock reproduction and the reproduction of the address information in the header region 2 is permitted for the recording sector 1A and the next recording sector 1B, and the clock reproduction and the reproduction of the data in the corresponding data recording regions 4 are permitted. Accordingly, once address information has been reproduced from one recording sector, the address information and the data can be read in a more secured manner using the sector synchronization pulse 31 as the reference.

In the above example, the system control 18 generates three types of gate signals using the sector synchronization pulse 31, while the reproduction permit circuit 32 generates three types of permit signals using the VFO detection pulse 26 and the three types of gate signals. Alternatively, the system control 18 may have the function of the reproduction permit circuit 32 so that the system control 18 can directly generate the three types of permit signals.

Figure 15:
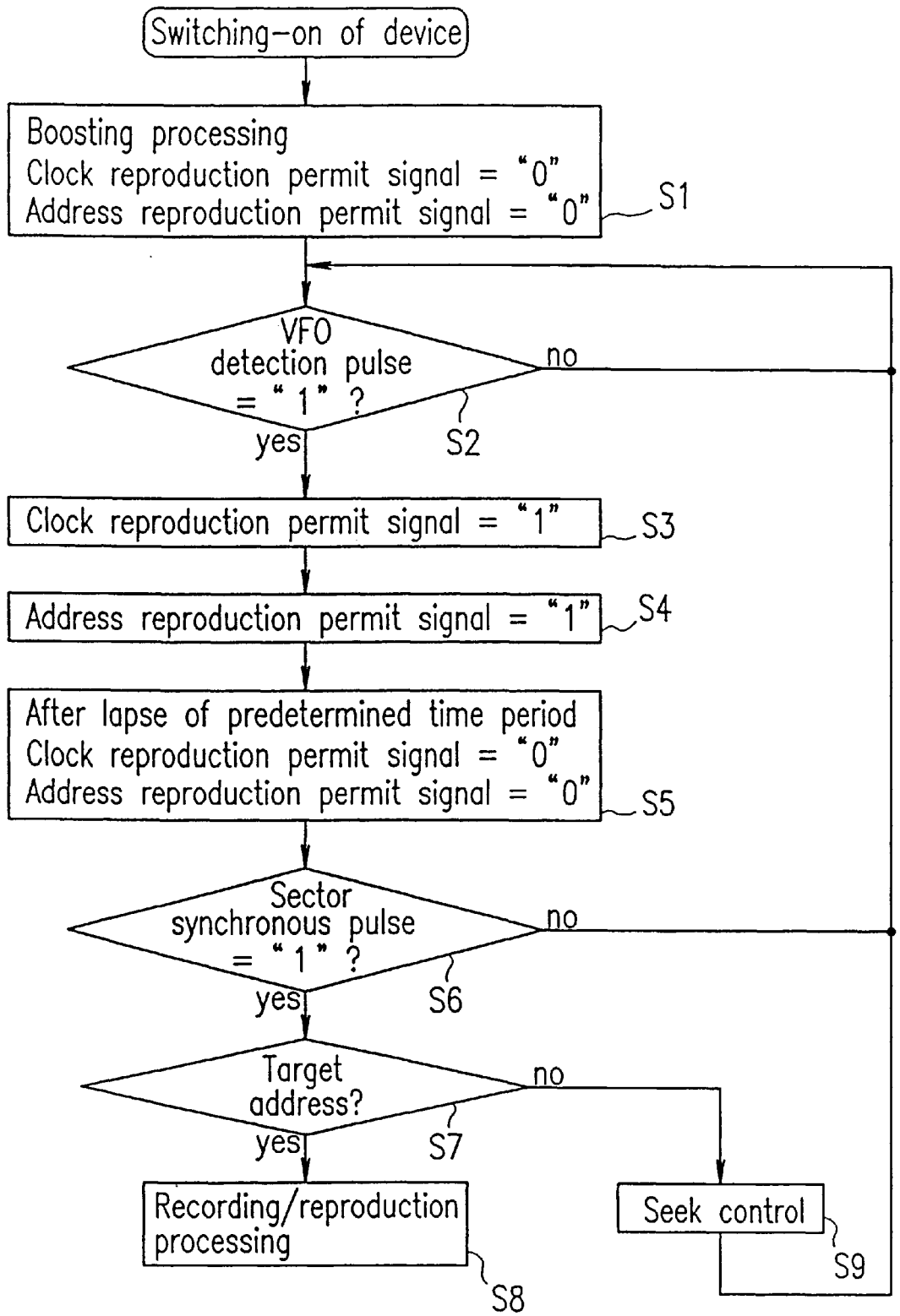
FIG. 15 is a flowchart of an exemplary process after the turning-on of a system control of the optical disk device of the example according to the present invention.

FIG. 15 is a flowchart showing an example of a process performed when, after the switching-on of the optical disk device 100 (FIG. 10), the system control 18 outputs the clock reproduction permit signal 34 and the address reproduction permit signal 36 using the VFO detection pulse 26 and the sector synchronization pulse 31.

When the optical disk device 100 is switched on, the system control 18 first performs a boosting processing (step 1). The boosting processing includes the control of the rotation of the spindle motor 7 by the servo system 50, the control of the movement of the head 8, the control of the power of the semiconductor laser of the head 8, the focusing control of the optical system, the tracking control, and the like. In the boosting processing, both the clock reproduction permit signal 34 and the address reproduction permit signal 36 are reset to "0".

Once the head 8 is positioned above a predetermined track of the optical disk 1a by tracking, the VFO region is detected in the manner described above (step 2). When the "1" level of the VFO detection pulse is detected, the clock reproduction permit signal 34 is set at "1" (step 3). Subsequently, the address reproduction permit signal 36 is set at "1" (step 4). After the lapse of a predetermined time period, the address reproduction permit signal 36 and the clock reproduction permit signal 34 are reset to "0" again (step 5), and the sector synchronization pulse 31 is detected (step 6).

The sector synchronization pulse 31 becomes "1" when the address demodulation circuit 30 reads address information correctly. In synchronization with this pulse signal, the address information 40 output from the address demodulation circuit 30 is read, so as to determine whether or not it indicates a target recording sector (step 7). If the read address information 40 indicates the target recording sector, the process proceeds to the control for recording/reproduction (step 8). If the read address information 40 does not indicate the target recording sector, the process proceeds to the seek control (step 9).

If the address demodulation circuit 30 fails to read the address information, the sector synchronization pulse 31 will not become "1" for a predetermined time period at step 6. In such a case, the process returns to step 2 for the VFO detection.

With the process along the flow described above, the clock reproduction permit signal 34 and the address reproduction permit signal 36 are generated at the timing as shown in FIG. 14. Thus, smooth reading of address information is possible even in the state observed before address information is reproduced immediately after the switching-on of the device, where the time reference by the sector synchronization pulse 31 has not yet been provided.

FIG. 16 is a flowchart showing an example of a process performed by the system control 18 for switching the processing mode between the initial mode and the normal mode. The initial mode as used herein corresponds to the time period from the switching-on of the device or a track jump to perform a seek and the like until the address information is first reproduced. The normal mode corresponds to the time period after a predetermined address information has been read until a next track jump is generated.

Referring to FIG. 16, the processings from step 1 through step 9 are the same as corresponding processings in FIG. 15. The description thereof is therefore omitted here.

As shown in FIG. 16, at step 10, whether the mode is the initial mode or the normal mode is determined. When the address information has been correctly read and recording/reproduction at the target recording sector has been performed in the preceding processings, the mode is determined to be the normal mode. The mode is determined to be the initial mode after the boosting processing (step 1), after the reading of the address information is unsuccessful at step 6, or after the address information which has been successfully read is determined not to be the target recording sector at step 7 and the seek control is performed (step 9).

In the normal mode, the VFO detection processing (step 2) is not performed, but the processings of steps 3, 4, and 5 are performed using the timing at which the sector synchronization pulse 31 becomes "1" as the reference. In the initial mode, the VFO detection processing (step 2) is first performed, followed by the processings of steps 3, 4, and 5 using the timing at which the VFO detection pulse 26 becomes "1" as the reference.

With the above processings, address information can be read smoothly after the switching-on of the device or after a track jump, and, after the reproduction of the address information, the address information and the data can be read in a more ensuring manner using the sector synchronization pulse 31 as the reference.

Thus, in the first example, the method for recording/reproducing data on/from the optical disk 1 $a$ having the signal format shown in FIGS. 5B and 5C by use of the optical disk device 100 having the block construction shown in FIG. 10, especially, the method for reading address information, was described.

In the first example, the (2, 10) modulation code is used as the modulation code for the address information regions ID of the header region 2 and the data recording region 4. It will be appreciated, however, that the modulation code is not restricted to the above, and any type of run length limit code having a fixed maximum inversion interval may be used. The pattern of the address mark AM may be determined so that the above conditions for the maximum inversion interval $T_{max}$ are satisfied.

In the first example, the information recorded on the VFO regions has been described to be a pattern composed of sequential 4-bit long marks/spaces shown in FIG. 6. It is appreciated, however, that the pattern for the VFO regions is not restricted to this pattern, and any pattern may be used in which the length of each mark or space is equal to or more than the minimum inversion interval $T_{min}$ and less than the maximum inversion interval $T_{max}$ of the modulation code (run length limit code) used for the recording on the address information region ID. As described above, however, since a shorter mark/space pattern having a length closer to the minimum inversion interval $T_{min}$ is more preferable since the number of repetition periods per unit length is larger and thus a faster clock reproduction is obtained.

In this example, the patterns shown in FIGS. 7A to 7C, FIGS. 8A to 8D, and FIG. 9 were described as examples of the address marks AM. The patterns of the address marks AM are not restricted to these patterns. The detection of the address marks AM is possible if the pattern includes two repetitions of a pattern having a length of 3 or more bits added to the maximum inversion interval $T_{max}$ of the modulation code (run length limit code) used for the recording of the address information regions ID.

In this example, the header region 2 is composed of four address regions. The header region 2 is not restricted to this construction. For example, the reproduction of address information is possible by the construction of the header region which includes only one address region. However, the reliability of the reading of the address information can be improved by forming a plurality of address regions ID where substantially the same address information is stored. As described above, in consideration of the error rate for the address information and the allowance of the number of unrecognizable recording sectors, it is preferable to form four or more address regions for one header region 2. Furthermore, in view of the practical allowance and the maximum securement of the data recording regions 4, it is more preferable for the header to include four address regions ID as described in the first example.

(EXAMPLE 2)

FIG. 17A is a view illustrating a format of a recording sector 51 of an optical disk of the second example according to the present invention. As shown in FIG. 17A, the recording sector 51 starts with a header region 52 where addressing information for reading address information is prerecorded. A gap region 53, a data recording region 54, a postamble PAO, and a buffer region 55 respectively follow the header region 52 in this order.

The gap region 53 has no data recorded thereon, but is used for power control of a semiconductor laser used for data recording/reproduction and the like, for example. The data recording region 54 is used to record user data. Redundant data such as an error correction code is added to the user data, to form digital data. The digital data is modulated using a run length limit code generated by use of a state machine. The modulated data is recorded on the data recording region 54 using the mark length recording. This run length limit code is called a state modulation code. The postamble PAO follows the end of the data recording region 54. The pattern of the postamble PAO is determined based on the modulation results of the data recording region 54. The buffer region 55 is provided to absorb a rotational shift of the optical disk and the like. In the header region 52, information may be recorded as pits in a concave and convex shape on the recording surface, or as marks optically recorded in substantially the same manner as that used in the recording on the data recording region.

As shown in FIG. 17B, the header region 52 is divided into four address regions 56$a$, 56$b$, 56$c$, and 56$d$. Each of the address regions includes a VFO region, an address mark AM, an address information region ID, and a postamble PA. For example, the address region 56$a$ includes a VFO region VF01, an address mark AM, an address information region ID1, and a postamble PA1, while the address region 56$b$ includes a VFO region VFO2, an address mark AM, an address information region ID2, and a postamble PA2. The address information regions ID1, ID2, ID3, and ID4 will hereinafter be collectively referred to as the address information region ID. Also, the postambles PA1, PA2, PA3, and PA4 will hereinafter be collectively referred to as the postamble PA.

In this example, as in the first example, no sector mark is recorded on each header region 52, but the four address regions similar to one another, each composed of the VFO region, the address mark AM, the address information region ID, and the postamble PA, are recorded sequentially.

The VFO regions VFO1, VFO2, VFO3, and VFO4 are used so that an optical disk device can obtain clock reproduction from a reproduced signal. As in the first example, each VFO region has a sequential pattern that includes marks and spaces of a fixed length (e.g., 4-bit length) appearing alternately, for example. The VFO regions may have the same length or different lengths. For example, if the head VFO region VFO1 is made longer than the other VFO regions, stable clock reproduction is obtained at the beginning of the header region 52.

Each address mark AM is provided so that the optical disk device can identify the position of the subsequent address information region ID. For example, like the address mark AM used in the first example, a pattern including two repetitions of a pattern having a length of 3 bits added to the maximum inversion interval $T_{max}$ of the state modulation code is recorded.

On the address information region ID, digital data composed of data including address information such as the track number and the sector number with a predetermined error detection code added thereto are recorded using the mark length recording, after the digital data are modulated using the state modulation code.

FIGS. 18A to 18C are conceptual views for explaining the modulation method and the demodulation method of the state modulation code used in this example. The state modulation code is a modulation code which converts an 8-bit binary data unit into a 16-bit code sequence. A 16-bit output code sequence $Y_t$ for an 8-bit input data $D_t$ at a time t is determined based on a state $S_t$ at the time t. FIG. 18A shows an exemplary construction of a state modulation circuit 60. As shown in FIG. 18A, the state modulation circuit 60 includes a conversion table 56 and a D flipflop 57. The data $D_t$ and the state $S_t$ at the time t are input into the conversion table 56, and the code sequence $Y_t$ and a state $S_{t+1}$ at a next time t+1 (hereinafter, referred to as a next state) are output therefrom. The next state $S_{t+1}$ output from the conversion table 56 is input into the D flipflop 57 to be used for the next modulation.

FIG. 18B shows part of the content of the conversion table 56. The state $S_t$ at the time t includes a total of four states from St=1 to 4, and different code sequences $Y_t$ are allocated to the respective states. The state $S_t$ and the data $D_t$ at the time t determine the next state $S_{t+1}$. The 16-bit sequences allocated as the output code sequences $Y_t$ in the table are all the run length limit codes where the zero run is limited to the range of 2 to 10. Moreover, the next state $S_{t+1}$ has been determined so that the zero run is still limited to the range of 2 to 10 when the sequences at the two sequential times are connected.

Among the 16-bit sequences allocated in the table as the output code sequences $Y_t$, those of which next state $S_{t+1}$ is 1 or 2 are determined so that the last zero run thereof is 5 or less.

There is a case where the same output sequence $Y_t$ is allocated to different input data units $D_t$, like patterns p1 and p2 shown by the underlines in the table. In such a case, the next states for these output sequences are determined to be either state 2 or state 3 so as to be different from each other. In this case, for example, the pattern p1 has the next state 2, while the pattern p2 has the next state 3. Except for such a case, no double allocation of the same output sequence $Y_t$ will be found.

The code sequences $Y_t$ allocated to state 2 and state 3 have the following features. The output sequence $Y_t$ allocated to state 2 has "0"s at the first and thirteenth bits from left. The output sequence $Y_t$ allocated to state 3 has "1"s at either the first bit or the thirteenth bit from left.

In the demodulation of the state modulation code, the 16-bit code sequence $Y_t$ must be converted into an 8-bit binary data unit. FIG. 18C is a block diagram for explaining the construction of a demodulation circuit 61. In the demodulation circuit 61, the 16-bit code sequence $Y_t$ at a time t and a first bit $Y_{t+1\_1}$ and a thirteenth bit $Y_{t+1\_13}$ of a code sequence $Y_{t+1}$ at a next time t+1, i.e., a total of 18 , bits, are input into an inverse conversion table 58. The output from the inverse conversion table 58 at the time t is an 8-bit binary data unit $D_t$.

The inverse conversion table 58 shown in FIG. 18B basically corresponds to an inverse view of the conversion table 56. For patterns which have not been allocated double among the code sequences $Y_t$, the binary data unit $D_t$ as the demodulation result thereof is uniquely determined.

For a pattern which has been allocated double, like the pattern p1 and p2 in state 1 shown in FIG. 18B, the binary data unit $D_t$ thereof cannot be uniquely determined. However, as described above, such a double allocation of the same code sequence $Y_t$ is limited to the case where the next state thereof is state 2 or state 3. Accordingly, by recognizing the difference between the code sequences of state 2 and state 3, the original binary data unit $D_t$ can be uniquely determined. In other words, the binary data unit $D_t$ is uniquely determined by observing the first and thirteenth bits of the code sequence at the time t+1 which is the code sequence determined by the next state at the time t during the modulation.

In the address information region ID, data including the address information modulated in the modulation method as described above is recorded using the mark length recording.

The postamble PAO shown in FIG. 17A indicates the end of the data recording region 54, and has a pattern determined based on the modulated results of the data recording region 54.

The postambles PA1, PA2, PA3, and PA4 shown in FIG. 17B indicate the ends of the address regions 56a to 56d, respectively, and have patterns determined based on the modulation results of the corresponding address information regions ID1, ID2, ID3, and ID4 recorded immediately before the postambles.

Figure 19A:
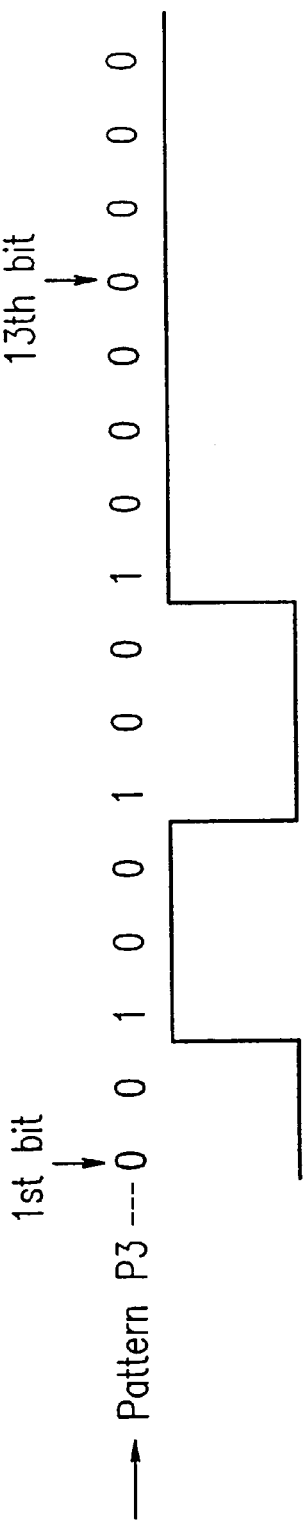
FIGS. 19A and 19B are views illustrating exemplary recording patterns for a postamble in the example according to the present invention.
Figure 19B:
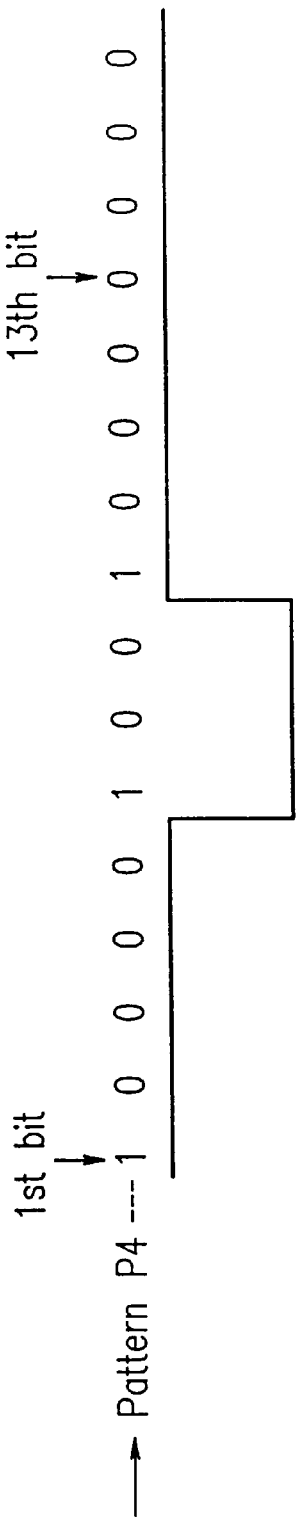

FIGS. 19A and 19B show examples of patterns of the postambles. The next state shown in FIGS. 19A and 19B indicates the next state obtained when the immediately preceding data unit has been modulated. In other words, for the postamble PAO, it indicates the next state obtained when the end data of the data recording region 54 has been modulated. For the postambles PA1, PA2, PA3, and PA4, it indicates the next states obtained when the end data of the address information regions ID1, ID2, ID3, and ID4 have been modulated. In the case where the next state is state 1 or state 2, a pattern p3 shown in FIG. 19A is selected as the postamble. In the case where the next state is state 3 or state 4, a pattern p4 shown in FIG. 19B is selected as the postamble. The selected postambles are recorded using the mark length recording.

When the pattern p3 follows any of the code sequences where the next state is state 1 or state 2, the zero run is still limited to the range of 2 to 10 at the coupling portion. When the pattern p4 follows any of the code sequences where the next state is state 3 or state 4, the zero run is still limited to the range of 2 to 10 at the coupling portion. Therefore, the run length limit will not be broken by adding the postamble.

The first and thirteenth bits of the pattern p3 are both "0", while the first bit of the pattern p4 is "1".

By using the patterns p3 and p4 as the postambles, patterns recorded at the end of the data recording region 54 and the address information regions ID1, ID2, ID3, and ID4 can be uniquely demodulated.

As another feature, the second, twelfth, and fourteenth bits of the pattern p3 which are bits adjacent to the specific bits for identifying the state (the first and thirteenth bits) are all "0". This prevents the state from being mistakenly modulated by recognizing the thirteenth bit as "1" due to a bit shift and the like.

(EXAMPLE 3)

FIG. 20A schematically illustrates an optical disk 201a of the third example according to the present invention. Referring to FIG. 20A, the optical disk 201a has tracks 201b formed on the surface thereof in a spiral shape. Each track 201b is divided into recording sectors 201c in accordance with a predetermined physical format. As shown in FIG. 20A, the recording sectors 201c are sequentially arranged in the circumferential direction to form one track 201b.

FIG. 20B illustrates a format of each recording sector 201c of the optical disk 201a of the third example according to the present invention. Referring to FIG. 20B, the recording sector 201c starts with a header region 202 where addressing information for reading address information is prerecorded. A gap region 203, a data recording region 204, and a buffer region 205 follow the header region 202 in this order. The gap region 203 has no data recorded thereon, but is used for power control of a semiconductor laser used for data recording/reproduction and the like. The data recording region 204 is used to record user data. Redundant data such as an error correction code is added to the user data, to form digital data. The digital data is modulated using a run length limit code where the zero run is limited to the range of 2 to 10, i.e., a (2,10) modulation code. The modulated data is recorded on the data recording region 204 using the mark length recording. The buffer region 205 is provided to absorb a rotational shift of the optical disk and the like. In the header region 202, information may be recorded as pits in a concave and convex shape on the recording surface, or as marks optically recorded in substantially the same manner as that used in the recording on the data recording region.

As shown in FIG. 20C, the header region 202 is divided into four address regions 206a, 206b, 206c, and 206d. Each of the address regions includes a VFO region, an address mark AM, an address information region ID, and a postamble PA. For example, the address region 206a includes a VFO region VFO1, an address mark AM, an address information region ID1, and a postamble PA1, while the address region 206b, includes a VFO region VFO2, an address mark AM, an address information region ID2, and a postamble PA2. The address information regions ID1, ID2, ID3, and ID4 are hereinafter collectively referred to as the address information region ID. Also, the postambles PA1, PA2, PA3, and PA4 are hereinafter collectively referred to as the postamble PA.

In this example, as in the above examples, no sector mark is recorded on each header region 202, but the four address regions, each composed of the VFO region, the address mark AM, the address information region ID, and the postamble PA, are recorded sequentially.

The VFO regions VFO1, VFO2, VFO3, and VFO4 are used so that an optical disk device can obtain clock reproduction from a reproduced signal. As in the first example, for example, each VFO region has such a sequential pattern that includes marks and spaces of a fixed length (e.g., 4-bit length) appearing alternately. The VFO regions may have the same length or different lengths. For example, if the head VFO region VFO1 is made longer than the other VFO regions, stable clock reproduction is obtained at the beginning of the header region 202.

Each address mark AM is provided so that the optical disk device can identify the position of the subsequent address information region. For example, as in the address mark AM used in the first example, a pattern including twice repetition of a pattern having a length of 3 bits added to the maximum inversion interval $T_{max}$ of the modulation code (run length limit code) is recorded.

On the address information region ID, digital data composed of data including address information such as the track number and the sector number with a predetermined error detection code added thereto are recorded using the mark length recording, after the digital data is modulated using the state modulation code.

Figure 21A:
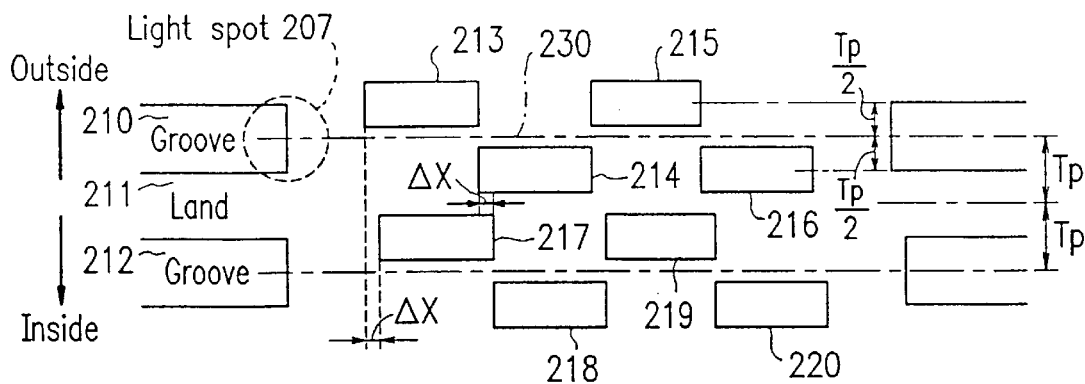
FIGS. 21A and 21B are schematic views illustrating exemplary arrangements of an address region of a header region of the optical disk of the example according to the present invention.

FIG. 21A shows an arrangement of the address regions of the header region 202 recorded on the recording surface of the optical disk of this example. As shown in FIG. 21A, in the optical disk, information is recorded on both groove tracks and land tracks. The reference numerals 210 and 212 denote the groove tracks, while the reference numeral 211 denotes the land track. Address regions 213 to 220 are formed so as to override the adjacent groove tracks and land tracks. The address regions 213 and 217 correspond to the address region 206a. The address regions 214 and 218 correspond to the address region 206b. The address regions 215 and 219 correspond to the address region 206c. The address regions 216 and 220 correspond to the address region 206d. The distance between the center line of the land track and the center line of the groove track is a track pitch Tp. Each address region is displaced from the centerline of the track by $T_p/2$ toward inside or outside of the disk. For example, the address regions 213 to 216 are alternately arranged on both sides of the groove track 210 with respect to the centerline thereof. The reference numeral 207 denotes a light spot. During the reproduction, address information is read from the address regions 213 to 216 along the groove track 210, and from the address regions 217, 214, 219, and 216 along the land track 211. By arranging the address regions in the above manner, it is possible to read the address information from both the land tracks and the groove tracks.

Hereinbelow, a method for forming a prototype for producing a stamper used for the fabrication of a disk substrate having convex-shaped groove tracks and the address regions as concave and convex shaped pits described above will be described. The tracks and the address regions are formed by irradiating the rotating disk prototype with laser light for cutting. By continuous radiation of laser light, the groove track having one continuous groove is formed. By intermittent ON/OFF radiation of laser light, portions irradiated with laser light are formed as marks (pit data) in the address regions. The other portions which have not been irradiated with the laser light are left as spaces (non-pit data). For example, a predetermined pattern as described in the above examples is recorded by a combination of the marks and the spaces. In this example, the address regions are arranged to be displaced inside and outside the center of the track (wobbling arrangement). Accordingly, the ON/OFF radiation of laser light is performed by shifting the center of the laser light for cutting in the radial direction by a predetermined amount $T_p/2$ for every address region. Incidentally, at the production of the disk prototype, the cutting is performed from the surface opposite the surface which is to be the recording surface at the reproduction operation. Therefore, the concave and convex portions of the pits and the grooves at the production of the disk prototype are reverse to those as are viewed from the reproduction head at the reading operation.

Figure 21B:
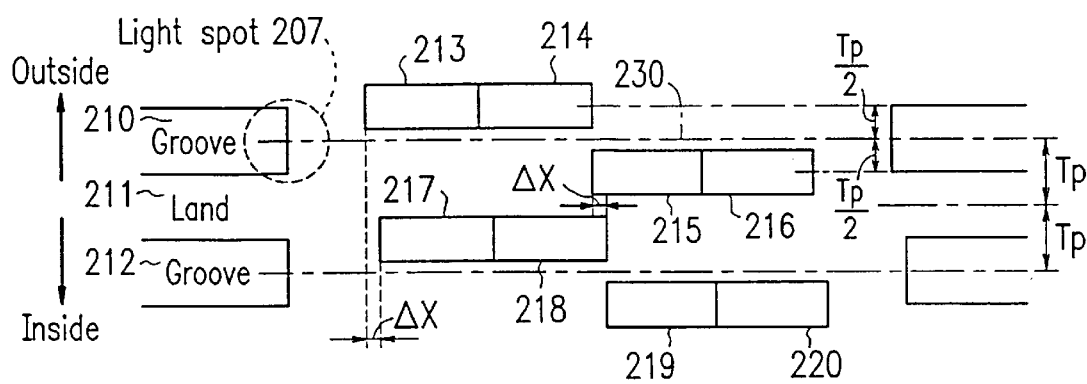

FIG. 21B shows another arrangement of the address regions of the header region 202 recorded on the recording surface of the optical disk of this example.

In the optical disk shown in FIG. 21B, information is recorded on both groove tracks and land tracks. The reference numerals 210 and 212 denote the groove tracks, while the reference numeral 211 denotes the land track. Address regions 213 to 220 are formed so as to override the adjacent groove tracks and land tracks. The address regions 213 and 217 correspond to the address region 206a. The address regions 214 and 218 correspond to the address region 206b. The address regions 215 and 219 correspond to the address region 206c. The address regions 216 and 220 correspond to the address region 206d. The distance between the centerline of the land track and the centerline of the groove track is a track pitch Tp. The two preceding address regions (213, 214, 217, 218) are displaced outside the centerlines 230 of the groove tracks by $T_p/2$. The two subsequent address regions (215, 216, 219, 220) are displaced inside the centerlines 230 of the groove tracks by $T_p/2$. The reference numeral 207 denotes a light spot. During the reproduction, address information is read from the address regions 213 to 216 along the groove track 210, and from the address regions 217, 218, 215, and 216 along the land track 211.

By arranging the address regions in the above manner, it is possible to read the address information from both the land tracks and the groove tracks.

Moreover, since every two address regions as a unit are alternately displaced inside and outside of the disk, the number of times at which the center of the laser light for cutting is shifted in the radial direction by $T_p/2$ during the production of the disk prototype reduces, compared with the arrangement shown in FIG. 21A, facilitating the cutting of the prototype of the optical disk.

During the production of the prototype of the optical disk, as shown in FIG. 21A (FIG. 21B), the groove 210 and the address regions 213, 214, 215, and 216 along the groove are first formed. Thereafter, after one rotation of the disk prototype, the groove 212 and the address regions 217, 218, 219, and 220 along the groove are formed. At this time, due to a variation in the rotational precision of the disk prototype and the like, the position of the address region 213 and the position of the address region 217 which corresponds thereto along the radial direction of the optical disk do not necessarily match with each other in the circumferential direction. If the ends of the address regions 213 and 217 are displaced by ΔX as shown in FIG. 21A (FIG. 21B), the end of the address region 217 (218) and the beginning of the address region 214 (215) overlap with each other by ΔX when data on the land track 211 is reproduced. This may results in failure to reproduce address information correctly.

Figure 21C:
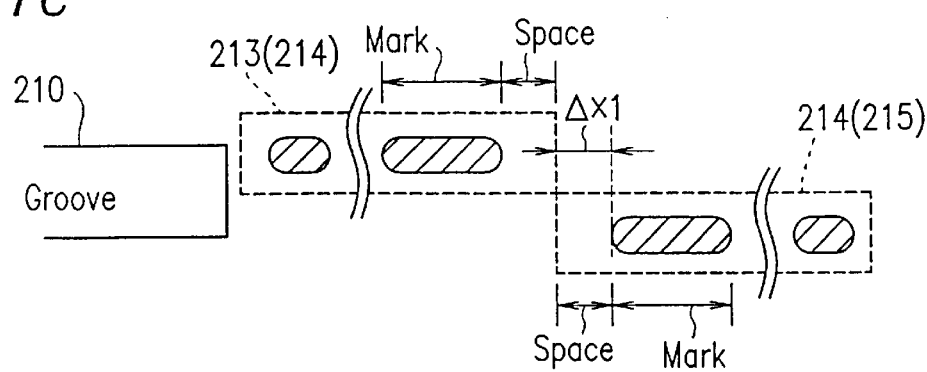
FIG. 21C is a view illustrating a coupling portion of address regions shown in FIGS. 21A and 21B.

To overcome this problem, as shown in FIG. 21C, it is arranged so that no mark is recorded but a space is provided at the end of each address region and furthermore a space (ΔX1) longer than the rotational precision (ΔX) at the cutting of the disk prototype is provided at the beginning of the next address region.

For example, the rotational precision at the cutting of the disk prototype is about 20 ns/revolution when the number of revolutions of the disk prototype is 700 rpm. Accordingly, in the case of an optical disk having a diameter of 120 mm, the value of ΔX is about 0.1 μm at maximum when converted into a length.

The operation in the above case will be described.

Figure 22A:
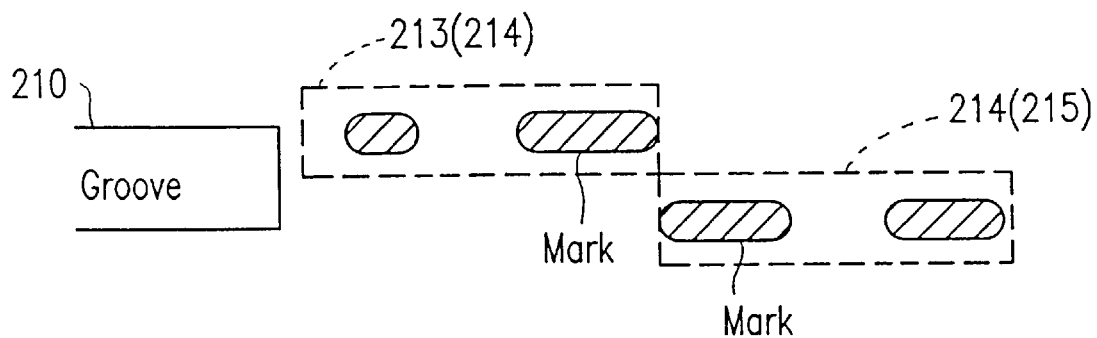
FIG. 22A is a schematic view illustrating the case where the coupling portion of the address regions of the optical disk includes marks and the marks are ideally formed.
Figure 22B:
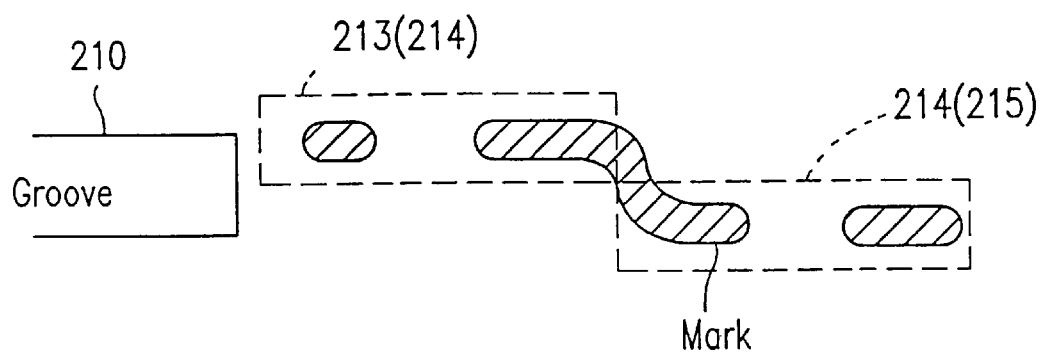
FIG. 22B is a schematic view illustrating the marks formed on the coupling portion of the address regions of the optical disk.

FIGS. 22A and 22B schematically illustrate the coupling portion of the two address regions 213 (214) and 214 (215). In the data sequences of the address regions shown in FIGS. 22A and 22B, the end (the final pattern) of the address region 213 (214) includes a mark, and the head pattern of the subsequent address region 214 (215) also includes a mark. FIG. 22A shows an ideal mark shape expected for such a data arrangement. In other words, the mark at the end of the address region 213 (214) and the mark at the beginning of the address region 214 (215) have a predetermined length and are formed at a center position of the respective address regions. In reality, however, when address pits are formed while shifting laser light for each address region in the cutting process of the disk prototype, if the marks consecutively appear in the coupling portion of the address region 213 (214) and the next address region 214 (215), the laser continues to emit laser light for cutting while shifting in the radial direction. Accordingly, in reality, the mark at the end of the address region 213 (214) and the mark at the beginning of the address region 214 (215) are consecutively formed as shown in FIG. 22B, forming an incorrect mark overriding the two address regions. As a result, correct data reproduction becomes difficult.

Figure 23A:
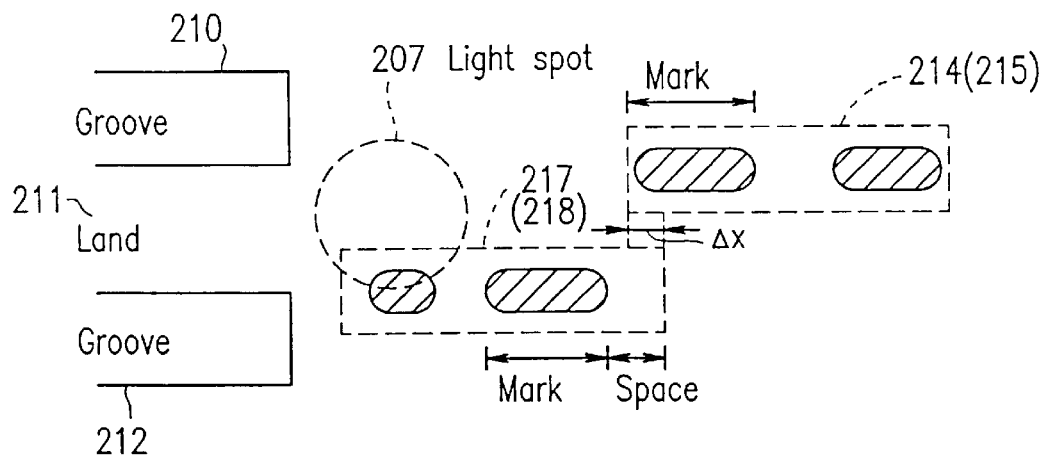
FIGS. 23A and 23B are views illustrating the operation where an optical spot performs data reproduction along a land track.
Figure 23B:
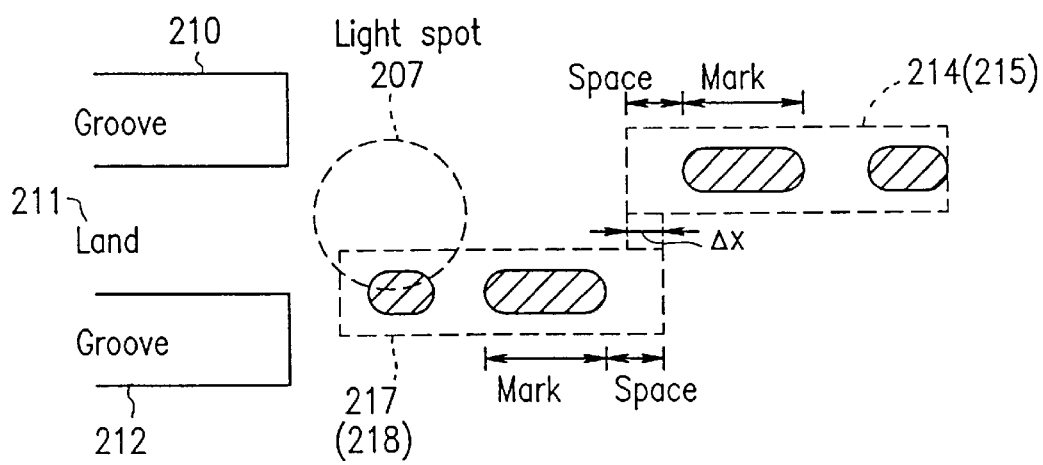

FIG. 23A and 23B illustrate the reading operation when a light spot 207 reproduces data from the land track 211.

FIG. 23A illustrates the case where the mark arrangement in the coupling portion of two adjacent address regions is not specifically considered. As shown in FIG. 23A, when the adjacent address regions 214 (215) and 217 (218) spatially overlap by a cutting precision ΔX, data read from the two address regions temporally overlap by an amount corresponding to ΔX. While the end of the address region 217 (218) includes a space, the beginning of the address region 214 (215) includes a mark. As shown in FIG. 23A, when the space at the end of the address region 217 (218) is overlapped by the mark at the beginning of the address region 214 (215), the end of the address region 217 (218) is regarded as having the mark. This causes a data error at the address region 217 (218).

FIG. 23B illustrates a data arrangement according to the present invention for overcoming the above problem. As shown in FIG. 23B, spaces are arranged at the end and the beginning of the adjacent address regions. With this arrangement, even if the space at the end of the address region 217 (218) is overlapped by the space at the beginning of the address region 214 (215), the overlapping portion is still a space, generating no data error on the address region 217 (218). This may result in failing to read correctly the length of the space at the beginning of the address region 214 (215).

However, the beginning of each address region includes the VFO region and, generally, it is not necessarily required to read all data on the VFO region. Moreover, no problem arises in the reading operation of the address region as far as the synchronization of the address region is recovered by the address mark AM following the VFO region so that the address information can be correctly recognized.

Also, at the cutting of the disk prototype, a space is always arranged between adjacent address regions to prevent marks from being continuously formed. Accordingly, the continuous radiation of laser light while shifting in the radial direction is prevented. Accordingly, the formation of a defect mark as shown in FIG. 22B is prevented.

Thus, by arranging spaces at the head and the end of each address region as shown in FIG. 23B, the failure in mark formation at the cutting of the disk prototype and the erroneous data reading due to the overlap of the address regions at the data reproduction from the address regions in the case of the wobbling arrangement of the address regions can be prevented.

Hereinbelow, the case of applying the mark arrangement of the postamble PA in this example to the data arrangement using the state modulating code described in Example 2 (FIGS. 18A and 18B) will be described. FIGS. 24A to 24D illustrate exemplary mark arrangements of the postamble PA in the case of using the state modulation code. In FIGS. 24A to 24D, the next state indicates the next state obtained when the immediately preceding data has been modulated, in other words, the next state obtained when the data at the end of the corresponding address information region ID has been modulated.

FIG. 24A shows the case where the next state is either state 1 or state 2 (see FIG. 18B) and the end of the address information region ID is a mark 240. In this case, a pattern p5 as shown in FIG. 24A, {0010010010000000}, is selected and recorded using the mark length recording. As described in Example 2, since the last zero run in the code sequence of which next state is either state 1 or state 2 is 5 or less, when any of the code sequences of which next state is either state 1 or state 2 is coupled with the pattern p5, the zero run at the coupling portion is still limited to the range of 2 to 10. The first and thirteenth bits of the pattern p5 are both "0". Also, by selecting the pattern p5, the end of the postamble PA, i.e., the end of the address region is always a space.

Accordingly, since both the head and the end of each address region are spaces, the failure in mark formation at the cutting of the disk prototype and the erroneous data reading due to the overlap of address regions at the data reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the coupling portion of the adjacent address regions always includes a 11-bit long space which is the maximum inversion interval. This makes it possible to increase the time for the movement of a laser beam at the cutting while the limit of the zero run of the run length limit code is maintained.

As a further feature of the pattern p5, the second, twelfth, and fourteenth bits which are bits adjacent to the specific bits for identifying the state (the first and thirteenth "0" bits) are all "0". This prevents the state from being mistakenly modulated by recognizing the thirteenth bit as "1" due to a bit shift and the like.

The pattern of the postamble PA is not limited to the pattern p5 shown in this example. Any pattern can be used as far as the number of zeros in the zero run satisfies the limit of the run length limit code used for the address information region ID, the state information is 1 or 2, the pattern is different from that of the address mark AM, and the pattern includes an odd number of "1"s.

FIG. 24B illustrates the case where the next state is either state 1 or state 2 (see FIG. 18B) and the end of the address information region ID is a space. In this case, a pattern p6 as shown in FIG. 24B, {0000010010000000}, is selected and recorded using the mark length recording. When any of the code sequences of which next state is either state 1 or state 2 is coupled with the pattern p6, the zero run at the coupling portion is still limited to the range of 2 to 10. The first and thirteenth bits of the pattern p6 are both "0". Also, by selecting the pattern p6, the end of the postamble PA, i.e., the end of the address region is a space. Accordingly, both the head and the end of each address region are spaces. Therefore, the failure in mark formation at the cutting of the disk prototype and the erroneous data reading due to the overlap of address regions at the data reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the coupling portion of the adjacent address regions always includes a 11-bit long space which is the maximum inversion interval. This makes it possible to increase the time for the movement of a laser beam at the cutting while the limit of the zero run of the run length limit code is maintained.

As a further feature of the pattern p6, the second, twelfth, and fourteenth bits which are bits adjacent to the specific bits for identifying the state (the first and thirteenth "0" bits) are all "0". This prevents the state from being mistakenly modulated by mistakenly recognizing the thirteenth bit as "1" due to a bit shift and the like.

The pattern of the postamble PA is not limited to the pattern p6 shown in this example. Any pattern can be used as far as the number of zeros in the zero run satisfies the limit of the run length limit code used for the address information region ID, the state information is 1 or 2, the pattern is different from that of the address mark AM, and the pattern includes an even number of "1"s.

FIG. 24C shows the case where the next state is either state 3 or state 4 (see FIG. 18B) and the end of the address information region ID is the mark 240. In this case, a pattern p7 as shown in FIG. 24C, {1000010010000000}, is selected and recorded using the mark length recording. When any of the code sequences of which next state is either state 3 or state 4 is coupled with the pattern p7, the zero run at the coupling portion is still limited to the range of 2 to 10. The first bit of the pattern p7 is "1". Also, by selecting the pattern p7, the end of the postamble PA, i.e., the end of the address region is always a space. Accordingly, both the head and the end of each address region are spaces.

Therefore, the failure in mark formation at the cutting of the disk prototype and the erroneous data reading due to the overlap of address regions at the data reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the coupling portion of the adjacent address regions always includes a 11-bit long space which is the maximum inversion interval. This makes it possible to increase the time for the movement of a laser beam at the cutting while the limit of the zero run of the run length limit code is maintained.

The pattern of the postamble PA is not limited to the pattern p7 shown in this example. Any pattern can be used as far as the number of zeros in the zero run satisfies the limit of the run length limit code used for the address information region ID, the state information is 3 or 4, the pattern is different from that of the address mark AM, and the pattern includes an odd number of "1"s.

FIG. 24D shows the case where the next state is either state 3 or state 4 (see FIG. 18B) and the end of the address information region ID is a space. In this case, a pattern p8 as shown in FIG. 24D, {1000000010000000}, is selected and recorded using the mark length recording. When any of the code sequences of which next state is either state 3 or state 4 is coupled with the pattern p8, the zero run at the coupling portion is still limited to the range of 2 to 10. The first bit of the pattern p8 is "1". Also, by selecting the pattern p8, the end of the postamble PA, i.e., the end of the address region is always a space. Accordingly, both the head and the end of each address region are spaces. Therefore, the failure in mark formation at the cutting of the disk prototype and the erroneous data reading due to the overlap of address regions at the data reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the coupling portion of the adjacent address regions always includes a 11-bit long space which is the maximum inversion interval. This makes it possible to increase the time for the movement of a laser beam at the cutting while the limit of the zero run of the run length limit code is maintained.

The pattern of the postamble PA is not limited to the pattern p8 shown in this example. Any pattern can be used as far as the number of zeros in the zero run satisfies the limit of the run length limit code used for the address information region ID, the state information is 3 or 4, the pattern is different from that of the address mark AM, and the pattern includes an even number of "1"s.

FIGS. 24E to 24H illustrate alternative examples of mark arrangement of the postamble PA in the case of using the state modulation code. In FIGS. 24E to 24H, the next state indicates the next state obtained when the immediately preceding data has been modulated, in other words, the next state obtained when the data at the end of the corresponding address information region ID has been modulated.

FIG. 24E illustrates the case where the next state is either state 1 or state 2 (see FIG. 18B) and the end of the address information region ID is the mark 240. In this case, a pattern p9 as shown in FIG. 24E, {0000010000010001}, is selected and recorded using the mark length recording. When any of the code sequences of which next state is either state 1 or state 2 is coupled with the pattern p9, the zero run at the coupling portion is still limited to the range of 2 to 10. The first and thirteenth bits of the pattern p9 are "0". Also, by selecting the pattern p9, the end of the postamble PA, i.e., the end of the address region is a space.

Accordingly, both the head and the end of each address region are spaces. Therefore, the failure in mark formation at the cutting of the disk prototype and the erroneous data reading due to the overlap of address regions at the data reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the 4-bit long mark at the end of the postamble can be used as the VFO.

FIG. 24F illustrates the case where the next state is either state 1 or state 2 (see FIG. 18B) and the end of the address information region ID is a space. In this case, a pattern p10 as shown in FIG. 24F, {0001000100010001}, is selected and recorded using the mark length recording. When any of the code sequences of which next state is either state 1 or state 2 is coupled with the pattern p10, the zero run at the coupling portion is still limited to the range of 2 to 10. The first and thirteenth bits of the pattern p1 are "0".

Also, by selecting the pattern p10, the end of the postamble PA, i.e., the end of the address region is a space.

Accordingly, both the head and the end of each address region are spaces. Therefore, the failure in mark formation at the cutting of the disk prototype and the erroneous data reading due to the overlap of address regions at the data reproduction of the address regions in the case of the wobbling arrangement of the address regions can be prevented.

Moreover, by setting the pattern of the VFO region arranged at the beginning of each address region at a sequential pattern signal starting with {000100010001000 . . . }, the 4-bit long mark at the end of the postamble can be used as the VFO.

FIG. 24G illustrates the case where the next state is either state 3 or state 4 (see FIG. 18B) and the end of the address information region ID is the mark 240. In this case, a pattern p11 as shown in FIG. 24G, {1000100100010001}, is selected and recorded using the mark length recording. When any of the code sequences of which next state is either state 3 or state 4 is coupled with the pattern p1, the zero run at the coupling portion is still limited to the range of 2 to 10. The first bit of the pattern p11 is "1". Also, by selecting the pattern p11, the end of the postamble PA, i.e., the end of the address region is a space.

Accordingly, both the head and the end of each address region are spaces. Therefore, the failure in mark formation at the cutting of the disk prototype and the erroneous data reading due to the overlap of address regions at the reproduction of the address regions in the case of the wobbling arrangement of the address regions may be prevented.

Moreover, by setting the pattern of the VFO region arranged at the beginning of each address region at a sequential pattern signal starting with {000100010001000 . . . }, the 4-bit long mark at the end of the postamble can be used as the VFO.

FIG. 24H illustrates the case where the next state is either state 3 or state 4.(see FIG. 18B) and the end of the address information region ID is a space. In this case, a pattern p12 as shown in FIG. 24H, {1000010000010001}, is selected and recorded using the mark length recording. When any of the code sequences of which next state is either state 3 or state 4 is coupled with the pattern p12, the zero run at the coupling portion is still limited to the range of 2 to 10. The first bit of the pattern p12 is "1". Also, by selecting the pattern p12, the end of the postamble PA, i.e., the end of the address region is a space.

Accordingly, both the head and the end of each address region are spaces. Therefore, the failure in mark formation at the cutting of the disk prototype and the erroneous data reading due to the overlap of address regions at the reproduction of the address regions in the case of the wobbling arrangement of the address regions can be prevented.

Moreover, by setting the pattern of the VFO region arranged at the beginning of each address region at a sequential pattern signal starting with {000100010001000 . . . }, the 4-bit long mark at the end of the postamble can be used as the VFO.

Exemplary arrangements of the above-described patterns of the postamble PA will be described. As an example, postambles having the patterns p5 to p8 shown in FIGS. 24A to 24D may be used as the postambles PA1, PA2, PA3, and PA4 shown in FIG. 20C. Alternatively, postambles having the patterns p9 to p12 shown in FIGS. 24E to 24H may be used as the postambles PA1, PA2, PA3, and PA4 shown in FIG. 20C.

Alternatively, the postambles having the patterns p5 to p8 shown in FIGS. 24A to 24D may be used as the postambles PA2 and PA4 shown in FIG. 20C, while the postambles having the patterns p9 to p12 shown in FIGS. 24E to 24H may be used as the postambles PA1 and PA3 shown in FIG. 20C. In this case, when the address regions on the disk are arranged as shown in FIG. 21B, the ends of the address regions 213 and 215 can be used as the VFO regions between the address regions 213 and 214 and between the address regions 215 and 216, respectively, where the shifting of the laser light for cutting is not required. Also, a 11-bit long space can be secured between the address regions 214 and 215 where the shifting of the laser light for cutting is required. In this way, both the merits of the two types of patterns can be obtained. Moreover, in this case, by setting the length of VFO1 and VFO3 larger than the length of VFO2 and VFO4, stable clock reproduction is obtained at the heading address regions 213 and 215 in the wobbling arrangement. (Example 4)

Figure 25A:
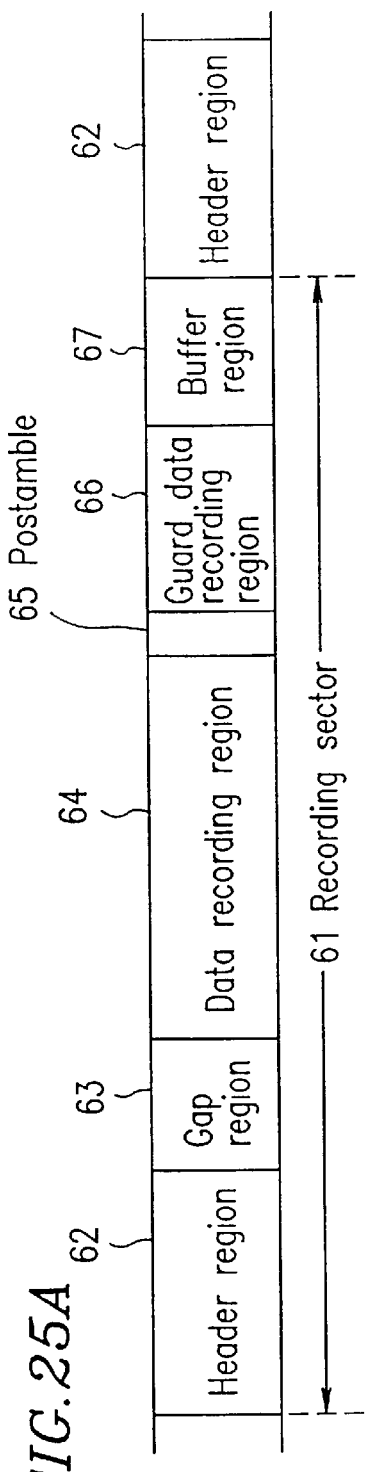
FIG. 25A is a view illustrating a signal format of a recording sector of an optical disk of still another example according to the present invention.

FIG. 25A illustrates a format of a recording sector 61 of an optical disk of the fourth example according to the present invention. The recording sector 61 starts with a header region 62 where addressing information for reading address information is prerecorded. A gap region 63, a data recording region 64, a postamble 65, a guard data recording region 66, and a buffer region 67 follow the header region 62 in this order. The gap region 63 has no data recorded thereon, but is used for power control of a semiconductor laser used for data recording/reproduction and the like, for example. The data recording region 64 is used to store user data. Redundant data such as an error correction code is added to the user data, to form digital data. The digital data is modulated using a predetermined run length limit code, and recorded on the data recording region 64 using the mark length recording.

The postamble 65 indicates the end of the data recording region 64. The pattern of the postamble 65 is determined based on the modulation results of the data recording region 64. The postamble 65 includes information used at the modulation of data, like the state identification bit described in the second example. The guard data recording region 66 is provided to suppress a degradation of the recording surface due to repeated recording of data on the same recording sector, and includes dummy data which does not have specific information. The buffer region 67 is provided to absorb a rotational shift of the optical disk and the like.

Data is recorded on the data recording region 64, the postamble 65, and the guard data region 66 by irradiating the regions with a light spot having a predetermined recording power to form optical marks on the recording surface. In general, the crystal structure of a thin film of the recording surface is changed into an amorphous state, to change the reflection characteristic of the mark portions. Thus, since a light spot having a comparatively large power is formed for the data recording, the recording surface bears a heat load. This causes a degradation of the recording surface.

In particular, in each recording sector, the difference in the heat load is generated at the boundary between a region where data has been recorded and a region where data has not been recorded. When data recording is repeated, the material of the recording film shifts due to the difference in the heat load. This may degrade the boundary region, thereby making it difficult to read data correctly. When such an optical disk that may be degraded at the recording surface due to repeated recording is used, important data should preferably be prevented from being recorded in the vicinity of the boundary where the difference in the heat load may be generated. In this example, in order to overcome the above problem, the guard data recording region 66 is provided. The guard data recording region 66 includes dummy data, which provides substantially the same level of heat load as that generated at the recording of data on the data recording region 64 or the postamble 65. In the data patterns written on the data recording region 64 and the postamble 65, low-frequency components increase when the number of the marks or spaces appearing in the patterns exceeds majority. The increase in the low-frequency components is not preferable because it varies the number of reproduced signal components in a servo band, affecting the servo system. Thus, the number of the low-frequency components in the patterns is desirably as small as possible. In many cases, therefore, the modulation is performed so that the total number of bits for marks and the total number of bits for spaces are as close as possible to each other.

Accordingly, in the pattern of the dummy data recorded on the guard data recording region 66, also, the total number of bits for marks is preferably equal to the total number of bits for spaces. With this arrangement, the heat load of the dummy data is in substantially the same level as the heat load generated at the recording of data on the data recording region 64 and the postamble 65.

For example, a pattern where a k-bit long mark and a k-bit long space are alternately repeated for an even number of times may be used, wherein k is a natural number satisfying $T_{min} \leq k \leq T_{max}$; $T_{min}$ and $T_{max}$ are the minimum and maximum inversion intervals, respectively, of the run length limit code.

The guard data recording region 66 preferably has a length of an integer number of data bytes because such a length facilitates the processings of the modulation circuit, the demodulation circuit, and the like.

Figure 25B:
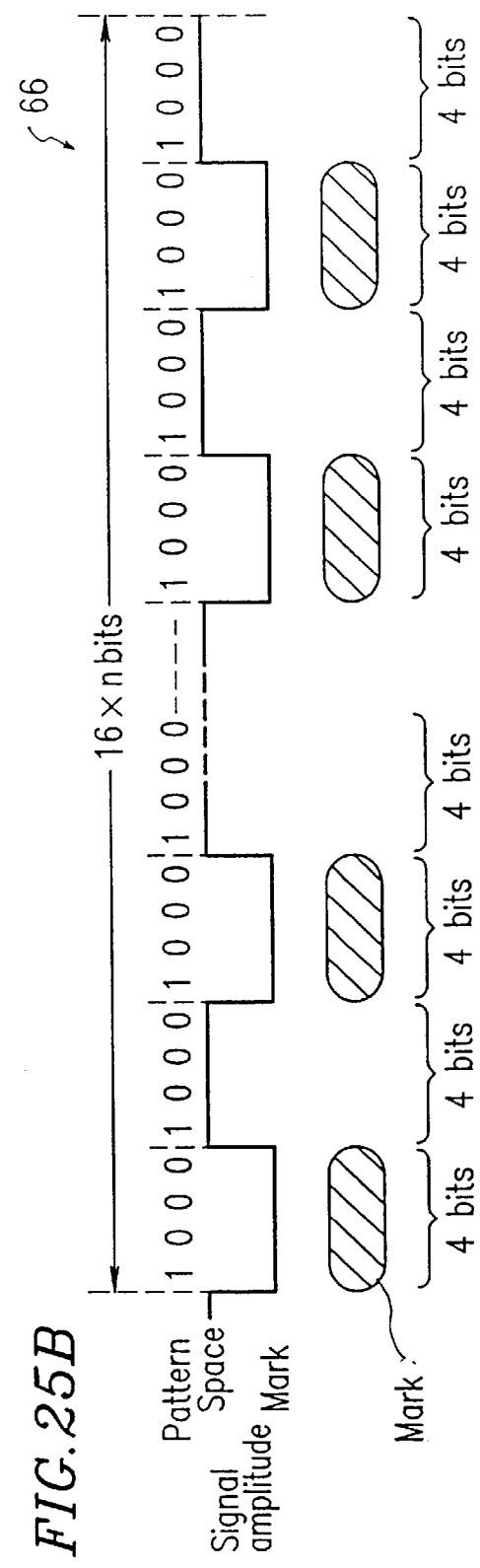
FIG. 25B is a view illustrating an exemplary pattern recorded on a guard data recording region in the example according to the present invention.

FIG. 25B illustrates an example of a pattern recorded on the guard data recording region 66 when such a modulation code that modulates one data byte into 16 bits ($T_{min}$=3, $T_{max}$=11) as was described above with reference to FIG. 18B is used. This pattern is composed of alternate repetition of 4-bit long mark and space, and has a total length of 16×n bits (n is a natural number).

In FIG. 25B, the dummy data starts with a mark. It would be understood that the pattern may also start with a space depending on the pattern at the end of the postamble 65.

Since the total number of bits for the marks is equal to the total number of bits for the spaces, the heat load of the pattern shown in FIG. 25B is in substantially the same level as the heat load generated at the recording of data on the data recording region 64 and the postamble 65. Therefore, the degradation of the recording film due to the difference in the heat load may be prevented.

Since the above pattern satisfies the conditions for the minimum inversion interval and the maximum inversion interval of the modulation code (run length limit code), it will not affect the reproduction of data from the header region and the data region.

INDUSTRIAL APPLICABILITY

As described above, in an optical disk according to the present invention, address synchronous information and address information modulated using the run length limit code are recorded on the header region of each recording sector. The pattern of the address synchronous signal includes two patterns having a length larger than the maximum inversion interval $T_{max}$ of the run length limit code by 3 bits or more. With this pattern, the reproduced signal of the address synchronous information is distinguished from the reproduced signal of other information, thereby preventing easy occurrence of erroneous detection of the address synchronous information. This makes it possible to perform stable bit synchronization for reproduction of address information using the address synchronization information without the necessity of forming a sector mark in each recording sector.

The address synchronous information is recorded using first and second patterns which are different in either a physical shape or an optical characteristic of the recording surface of the optical disk. For example, the first pattern is a convex portion (pit) formed physically on the recording surface thereof, and the second pattern is a concave portion formed physically on the recording surface of the optical disk. Alternatively, the first pattern is a recording mark formed by changing the reflection characteristic of the recording surface of the optical disk, and the second pattern is a space on the recording surface. The address synchronous information includes one first pattern having a length of ($T_{max}$+3) bits or more and one second pattern having a length of ($T_{max}$+3) bits or more, so that the address synchronous information can be distinguished from other data modulated by the run length limit code even when an error arises due to a bit shift and the like.

By equalizing the total bit length of the first pattern included in the header region and the total bit length of the second pattern included therein, the amount of low-frequency components contained in the pattern may be reduced. This will prevent the stability of the servo system from being lost during the data reproduction from the header region.

The header region includes four-time repetition of the address information and the address synchronous information. This reduces the number of defective recording sectors where address information is not readable in the optical disk with high recording density in an allowable range. Thus, the present invention provides a high-quality optical disk.

In an optical disk according to the present invention, the header region of each recording sector includes address information for identifying the position of the corresponding recording sector, address synchronous information for identifying the recording position of the address information for bit synchronization, and clock synchronous information for reproducing the clock signal. The address information has been modulated using a run length limit code of a minimum inversion interval of $T_{max}$ bits and a maximum inversion interval of $T_{max}$ bits ($T_{max}$ and $T_{min}$ are natural numbers satisfying $T_{max}>T_{min}$). The clock synchronous information is a sequential pattern of alternate repetition of d-bit long mark and space (where d is a natural number satisfying $T_{min}\times3$). The address synchronous information includes two patterns of which inversion interval is ($T_{max}$+3) bits or more, so that the reproduced signal of the address synchronous information is distinguished from the reproduced signal of other information. Faster clock reproduction is possible by reading the sequential pattern of alternate repetition of the d-bit long mark and space. Also, stable bit synchronization for reproducing the address information is possible by reading the address synchronous information.

In an optical disk according to the present invention, a pattern (sector mark) composed of a long mark for identifying the start of a recording sector is not recorded at the beginning of the recording sector. This reduces the overhead amount of data as a format. At the same time, as described above, both the detection of the beginning of the recording sector and the clock reproduction can be performed using the clock synchronous information.

In an optical disk according to the present invention, each recording sector includes the header region and the postamble region following the end of the header region, and the postamble region includes a pattern determined based on the modulation result of data of the header region. Accordingly, in the case where the data of the header region has been modulated using a modulation code for performing a conversion in a table based on a state, for example, the postamble can include therein information for state identification. This allows for efficient demodulation of data in the header region.

In an optical disk according to the present invention, each recording sector includes the header region, the data recording region, and the postamble region following the end of the data recording region, wherein the postamble region includes a pattern determined based on the modulation result of data on the data recording region. Accordingly, in the case where the data of the data recording region has been modulated using a modulation code for performing a conversion in a table based on a state, for example, the postamble can include therein information for state identification. This also allows for efficient demodulation of data in the data recording region.

The recording sector further includes the guard data recording region following the postamble region for recording dummy data. The guard data recording region includes a pattern of alternate repetition of a k-bit long optical mark and a k-bit long optical space, wherein k is a natural number satisfying $T_{min} \leq k \leq T_{max}$. This arrangement of the guard data region prevents the recording surface from being degraded due to repeated recording, as well as preventing the reliability of recorded data from being lost.

In an optical disk according to the present invention, each recording sector includes the header region, and the header region includes the address region having the postamble region at the end of the address region, and the postamble region has a pattern which ends with non-pit data or a space. The header region includes a plurality of address regions, and the VFO region at the beginning of each address region has a pattern which starts with non-pit data or a space. Alternatively, non-pit data or a space having a length of $T_{max}$ bits is provided between the address regions. With the above arrangement, in the case of recording the address regions in the middle of the land tracks and the groove tracks, the formation of marks in the optical disk fabrication process is facilitated, and moreover erroneous reading of information from the address regions may be prevented.

An optical disk device according to the present invention includes: means for reading a reproduced signal from the optical disk; address reproduction means for obtaining the address information from the reproduced signal; detection means for detecting the sequential pattern of the clock synchronous information from the reproduced signal to output a detection signal; and address reproduction permit means for permitting the address reproduction means to perform a read operation of the address information based on the detection signal. With this construction, stable and efficient reproduction of address information is possible for an optical disk which does not include a sector mark (a pattern composed of a long mark for identifying the start of a recording sector) at the beginning of each recording sector, by detecting the sequential pattern of the clock synchronous information. The conventional optical disk includes both a sector mark and clock synchronous information on the header region. According to the present invention, since no sector mark is required, the date recording region can be increased.

An optical disk device according to the present invention includes: clock generation means for generating a clock signal from the reproduced signal; and clock reproduction permit signal for permitting the clock generation means to perform an operation of generating the clock signal based on the detection signal of the sequential pattern of the clock synchronous information.

With this construction, stable and efficient reproduction of the clock signal is possible for an optical disk which does not include a sector mark at the beginning of each recording sector, by detecting the sequential pattern of the clock synchronous information.

A reproduction method for an optical disk according to the present invention includes the steps of: retrieving a reproduced signal from the optical disk; detecting the sequential pattern of the clock synchronous information from the reproduced signal; permitting reading of the address information if the sequential pattern is detected; reading the address information from the reproduced signal in response to the permission; and terminating the step of reading the address information in a predetermined time period after the permission to return to the step of detecting the sequential pattern. With this method, stable reading of the address information at the switching-on of the device or immediately after a track jump is possible for an optical disk having no sector mark but having clock synchronous information of a predetermined sequential pattern.

A reproduction method for an optical disk according to the present invention includes the steps of: retrieving a reproduced signal from the optical disk; detecting the sequential pattern of the clock synchronous information from the reproduced signal; permitting reproduction of a clock signal if the sequential pattern is detected; and reproducing the clock signal from the reproduced signal in response to the permission. With this method, stable reproduction of the clock signal at the switching-on of the device or immediately after a track jump is possible for an optical disk having no sector mark for identifying the start of the recording sector, but having clock synchronous information of a predetermined sequential pattern.

A reproduction method for an optical disk includes the steps of: retrieving a reproduced signal from the optical disk; determining a reproduction mode whether the reproduction mode is an initial mode during a time period from the switching-on of the device or a track jump until the address information is first read from the reproduced signal or a normal mode during a time period from the reading of the address information until a next track jump is generated; detecting the sequential pattern of the clock synchronous information from the reproduced signal; permitting reading of the address information if the sequential pattern is detected in the initial mode as a first permitting step; reading the address information from the reproduced signal in response to the permission; generating a sector pulse if the address information is correctly read; permitting reading of the address information from the reproduced signal based on the sector pulse in the normal mode as a second permitting step; and terminating the reading of the address information to return to the step of determining a reproduction mode if the address information fails to be read within a predetermined time period after either the first or second permission step. With this method, the processing after the switching-on of the device or a track jump until the address information is first reproduced and the processing at the normal data reproduction can be switched therebetween. Thus, efficient and reliable reading of the address information of each recording sector is possible.

By combining the optical disk according to the present invention with the optical disk device according to the present invention, or by combining the optical disk of the present invention with the optical disk reproduction method, further stable and efficient reading of the address information is possible even in the case where the recording density of the optical disk is improved by the technique such as the mark length recording and the land/groove recording.

What is claimed is:

1. An optical disk comprising a plurality of tracks each divided into a plurality of recording sectors, wherein:

each of the plurality of recording sectors includes a header region, the header region includes a plurality of address regions, and each of the address regions includes an address information region and a postamble region which is provided following the address information region;

address information for identifying a position of a corresponding one of the recording sectors is recorded in the address information region, the address information being information which is obtained by modulating each data of a plurality of data based on a corresponding one of a plurality of states;

information indicating a next state, to which a state which has been used to modulate a last one of the plurality of data is to transition, is recorded in the postamble region;

the information indicating the next state includes a specific bit having a predetermined value;

at least one bit of bits which are adjacent to the specific bit has a value which is identical to the predetermined value of the specific bit; and non-pit data or a space is located at an end of the postamble region.

2. An optical disk according to claim 1, wherein an error detection code of the address information is recorded in the address information region.

* * * * *